US009982619B2

(12) United States Patent
Mikawa

(10) Patent No.: US 9,982,619 B2
(45) Date of Patent: May 29, 2018

(54) DEVICE AND METHOD FOR DETECTING ABNORMALITY IN ROTATION PHASE DETECTION DEVICE, AND ROTATION POSITION CONTROL DEVICE USING SAME

(71) Applicant: HITACHI AUTOMOTIVE SYSTEMS, LTD., Hitachinaka-shi, Ibaraki (JP)

(72) Inventor: Kentaro Mikawa, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days. days.

(21) Appl. No.: 15/555,185

(22) PCT Filed: Mar. 2, 2016

(86) PCT No.: PCT/JP2016/056432
§ 371 (c)(1),
(2) Date: Sep. 1, 2017

(87) PCT Pub. No.: WO2016/140269
PCT Pub. Date: Sep. 9, 2016

(65) Prior Publication Data
US 2018/0051645 A1 Feb. 22, 2018

(30) Foreign Application Priority Data

Mar. 2, 2015 (JP) ................. 2015-040600

(51) Int. Cl.
*F01L 1/344* (2006.01)
*F02D 41/22* (2006.01)
(Continued)

(52) U.S. Cl.
CPC ....... *F02D 41/222* (2013.01); *F02D 13/0219* (2013.01); *F02D 41/062* (2013.01);
(Continued)

(58) Field of Classification Search
CPC ................ F01L 1/344; F01L 2013/103; F01L 2013/111; F01L 2013/113; F01L 2800/11;
(Continued)

(56) References Cited

U.S. PATENT DOCUMENTS 5,626,108 A * 5/1997 Kato .................. F01L 1/34406
123/90.15
5,979,378 A * 11/1999 Matsuno ............ F01L 1/34406
123/90.15
(Continued)

FOREIGN PATENT DOCUMENTS

| JP | 2006-291767 A | 10/2006 |
|----|---------------|---------|
| JP | 2008-163802 A | 7/2008 |
| JP | 4123127 B2 | 7/2008 |

OTHER PUBLICATIONS

Japanese Office Action issued in corresponding application dated Oct. 31, 2017 with partial English translation.
(Continued)

*Primary Examiner* — Jorge Leon, Jr.
(74) *Attorney, Agent, or Firm* — Foley & Lardner LLP

(57) ABSTRACT

It is intended to, when abnormality in either one of two rotation detection sections with different detection frequencies occurs, quickly and highly accurately detect the abnormality to favorably deal with abnormality occurring during low engine rotation. It is determined that abnormality is present in the rotation phase detection section, when an absolute value of difference between an actual VTC angle detected by a rotation phase detection section and an integrated value of a VTC change angle detected by motor rotation sensor 201 with the higher detection frequency than the frequency of detection of the actual VTC angle by the rotation phase detection section is equal to or greater than a predetermined value.

15 Claims, 18 Drawing Sheets

(51) Int. Cl.
*F02D 13/02* (2006.01)
*F02D 41/06* (2006.01)
*F02D 41/00* (2006.01)
*F01L 13/00* (2006.01)

(52) U.S. Cl.
CPC ......... *F01L 1/344* (2013.01); *F01L 2013/103* (2013.01); *F01L 2013/111* (2013.01); *F01L 2013/113* (2013.01); *F01L 2800/11* (2013.01); *F01L 2800/14* (2013.01); *F01L 2820/032* (2013.01); *F01L 2820/041* (2013.01); *F01L 2820/042* (2013.01); *F02D 41/009* (2013.01); *F02D 2013/0292* (2013.01)

(58) Field of Classification Search
CPC ............. F01L 2800/14; F01L 2820/032; F01L 2820/041; F01L 2820/042
USPC .............................. 123/90.17, 90.31
See application file for complete search history.

(56) References Cited

U.S. PATENT DOCUMENTS

| | | | | |
|---|---|---|---|---|
| 6,257,184 B1* | 7/2001 | Yamagishi | ............... | F01L 1/34 123/90.15 |
| 6,367,437 B2* | 4/2002 | Nakamura | ............... | F01L 1/34 123/90.17 |
| 6,405,697 B2* | 6/2002 | Mikame | ............... | F01L 1/34406 123/90.15 |
| 6,805,096 B2* | 10/2004 | Iizuka | ............... | F02D 41/009 123/406.18 |
| 7,726,270 B2* | 6/2010 | Miwa | ............... | B60K 6/445 123/179.3 |
| 2004/0237916 A1* | 12/2004 | Takahashi | ............... | F02D 13/0219 123/90.15 |
| 2006/0229797 A1* | 10/2006 | Sawada | ............... | F01L 1/08 701/114 |
| 2010/0071644 A1 | 3/2010 | Noda et al. | | |
| 2015/0211424 A1* | 7/2015 | Nomura | ............... | F02D 13/0238 123/472 |

OTHER PUBLICATIONS

International Preliminary Report on Patentability issued in corresponding International application PCT/JP2016/056432 with English translation.

* cited by examiner

DURING MIRROR-CYCLE OPERATION

DURING STARTING though control can be assuredly performed based on a rotation phase different from a rotation phase detected by the detection section at which abnormality has occurred.

DEVICE AND METHOD FOR DETECTING ABNORMALITY IN ROTATION PHASE DETECTION DEVICE, AND ROTATION POSITION CONTROL DEVICE USING SAME

TECHNICAL FIELD

The present invention relates to a device and a method for detecting abnormality in a rotation phase detection device and a device for controlling rotation position using such a device and a method for detecting abnormality, for example, relates to the device for detecting abnormality in a rotation phase detection device applied to a control device for a variable valve timing mechanism which changes valve timing of an engine valve (an intake valve or an exhaust valve) of an internal combustion engine.

BACKGROUND ART

For example, in a control device for a variable valve timing mechanism, while detecting a rotation phase (rotation angular position) of a camshaft with respect to a crankshaft by a rotation detection section, the rotation phase is brought closer to a target rotation phase by the variable valve timing mechanism, whereby valve timing is controlled.

Patent Document 1 realizes accurate valve timing control in a low engine speed zone by using a motor shaft rotation signal with a higher detection frequency than a detection frequency of the aforementioned rotation detection section in a variable valve timing mechanism which drives, with an electric motor, a camshaft for intake valve opening and closing.

REFERENCE DOCUMENT LIST

Patent Document

Patent Document 1: Japanese Patent Application Laid-open No. 4123127

SUMMARY OF THE INVENTION

Problem to be Solved by the Invention

However, in Patent Literature 1, if abnormality occurs in the rotation detection section even once at a time of extremely low engine rotation during the starting of the engine or before the engine is stopping, a rotation phase, that is, valve timing of the intake valve may erroneously be detected, which may result in continuation of driving control of the valve timing mechanism according to an erroneous motor manipulated variable based on the aforementioned erroneous detection, causing great overshooting of the valve timing with respect to a target value. As a result, engine performance (low engine rotation performance in particular) is impaired, leading to a risk of occurrence of secondary failure such as stopper durability deterioration and firm attachment of a movable component of the valve timing mechanism to the stopper caused by strong abutting of the movable component.

Moreover, conventional detection of abnormality in a rotation detection section is performed through monitoring a sequence of cylinder discrimination values of a cam sensor provided at a camshaft, and it takes a long period of time from abnormality occurrence to abnormality detection, during which overshooting occurs based on an erroneous motor manipulated variable as described above, so that engine performance is similarly impaired, leading to a risk of secondary failure such as stopper durability deterioration and firm attachment to the stopper.

In view of such conventional problems, the present invention has been made, and it is an object of the invention to permit quick and highly accurate detection of abnormality to thereby favorably deal with any abnormality occurring during low engine rotation, when the aforementioned abnormality occurs in either one of two rotation detection sections with different detection frequencies.

Means for Solving the Problem

According to one aspect of the present invention, a device for detecting abnormality in a rotation phase detection device, the rotation phase detection device including: a first rotation detection section which detects a rotation phase of a second rotating body with respect to a first rotating body at predetermined cycles, based on a rotation angular position of the first rotating body and a rotation angular position of the second rotating body rotated by an actuator with respect to the first rotating body; and a second rotation detection section which detects a relative change angle of the second rotating body caused by the actuator with respect to the first rotating body with a higher detection frequency than a detection frequency of the first rotation detection section, wherein the device for detecting abnormality determines presence or absence of abnormality in one of the first rotation detection section or the second rotation detection section, based on a change amount of the rotation phase detected by the first rotation detection section and an integrated value of the relative change angle in the predetermined cycle detected by the second rotation detection section.

According to one aspect of the invention, a device for controlling rotation position of a rotating body includes the aforementioned device for detecting abnormality in a rotation phase detection device, wherein when the device for detecting abnormality in a rotation phase detection device determines that abnormality is present in either one of the first rotation detection section and the second rotation detection section, the device for controlling rotation position continues driving control of the second rotating body by the actuator, or limits or stops output of a manipulated variable for driving the actuator, according to a rotation phase of the second rotating body calculated based on a detection value of the other detection section.

Effects of the Invention

With the device for detecting abnormality in a rotation phase detection device, when abnormality in the first rotation detection section or the second rotation detection section occurs, it is possible to quickly and highly accurately detect the abnormality based on detection values of the both.

With the device for controlling rotation position of a rotating body, when the device for detecting abnormality in a rotation phase detection device determines that abnormality is present in either one of the first rotation detection section and the second rotation detection section, fail-safe processing of the driving control of the second rotating body is performed based on the rotation phase of the second rotating body calculated based on the detection value of the other detection section.

Consequently, it is possible to suppress control performed at an unfavorable rotation phase caused through overshooting of the rotation phase of the second rotating body with respect to a target value due to abnormal rotation phase detection value.

BRIEF DESCRIPTION OF THE DRAWINGS

FIG. 11A illustrates the one in case of clockwise motor rotation; and FIG. 11B illustrates the one in case of counterclockwise motor rotation.

FIG. 12A illustrates the valve timing during mirror cycle operation after starting; FIG. 12B illustrates the valve timing during starting.

MODE FOR CARRYING OUT THE INVENTION

Hereinafter, one embodiment of the present invention will be described with reference to the accompanying drawings.

Figure 1:
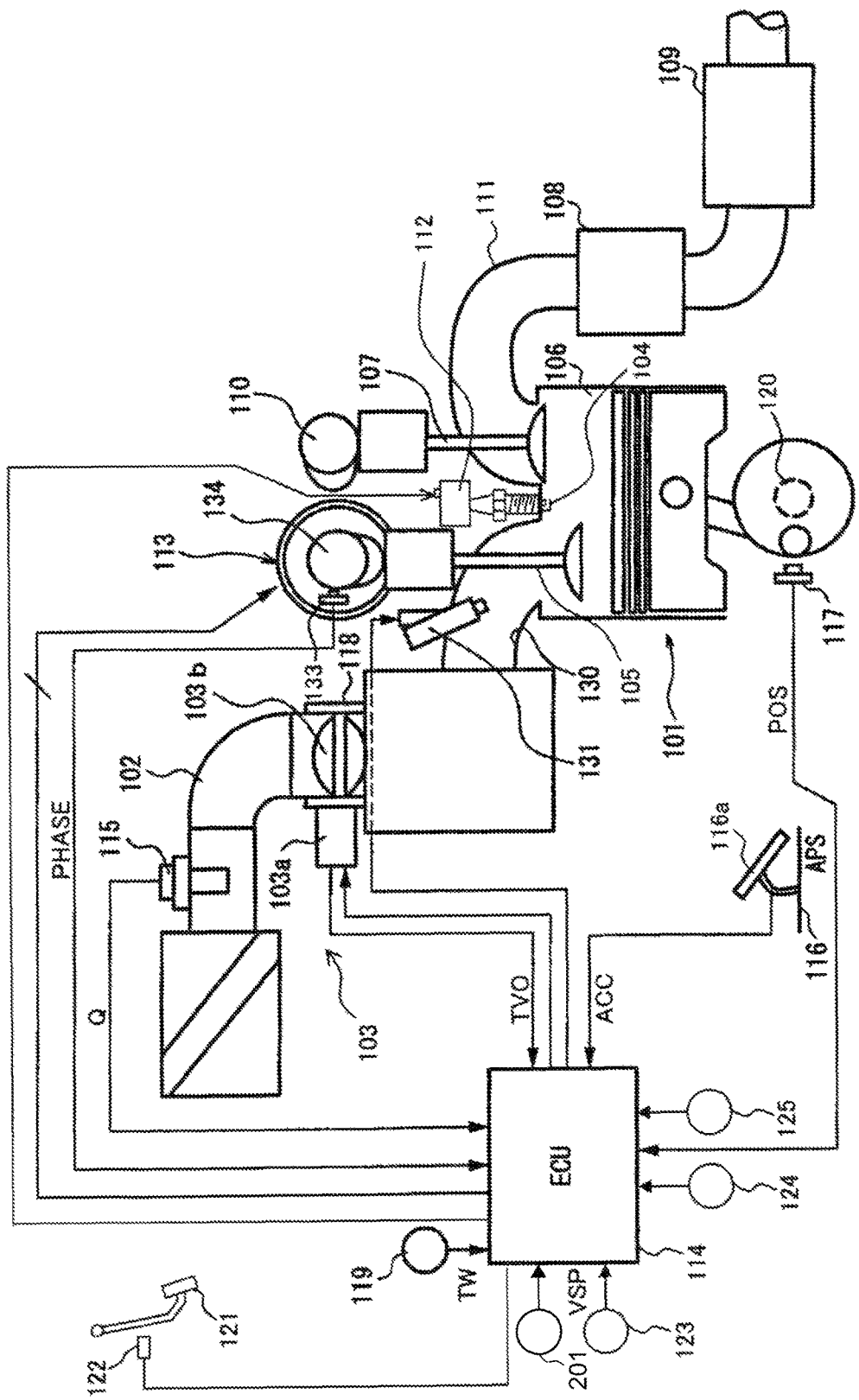
FIG. 1 is a system configuration diagram of an internal combustion engine according to embodiments.

FIG. 1 is a configuration diagram of an internal combustion engine 101 in vehicle to which a device for detecting abnormality in a rotation phase detection device according to embodiments of the invention is applied. Note that vehicle internal combustion engine 101 is an in-line four-cylinder, four-cycle engine in the present embodiment, but the embodiment is not limited to the present example.

In FIG. 1, an electronically controlled throttle 103, which opens and closes a throttle valve 103b with a throttle motor 103a, is provided in an intake pipe 102 of internal combustion engine 101.

Thus, internal combustion engine 101 intakes the air inside a combustion chamber 106 of each cylinder via electronically controlled throttle 103 and an intake valve 105.

A fuel injection valve 131 is provided in an intake port 130 of each cylinder. Fuel injection valve 131 opens in response to an injection pulse signal provided from an ECU (engine control unit) 114 acting as a control device and injects fuel.

Fuel inside a combustion chamber 106 is ignited and combusted by spark ignition performed using an ignition plug 104. Each ignition plug 104 is fitted with an ignition module 112 having a built-in ignition coil and a built-in power transistor which controls power supply to the ignition coil.

Combustion gas inside combustion chamber 106 flows into an exhaust pipe 111 via an exhaust valve 107. A front catalytic converter 108 and a rear catalytic converter 109 provided at exhaust pipe 111 purify exhaust air flowing through exhaust pipe 111.

An intake camshaft 134 and an exhaust camshaft 110 integrally include a cam, by which intake valve 105 and exhaust valve 107 are operated.

Valve timing of intake valve 105 is variably controlled by a variable valve timing mechanism (electric valve timing control (VTC)) 113 which rotates intake camshaft 134 with respect to a crankshaft 120 by using an electric motor (actuator).

As illustrated in FIGS. 2 to 7, electric VTC 113 includes: a timing sprocket 1 as a driving rotating body which is rotated by crankshaft 120 of the internal combustion engine; intake camshaft 134 which is rotatably supported on a cylinder head via a bearing 44 and which is rotated by a rotating force transmitted from timing sprocket 1; a cover member 3 which is arranged at a position in front of timing sprocket 1 and which is firmly attached to a chain cover 40 as a fixation section with a bolt; and a phase changing mechanism 4 as a variable mechanism which is arranged between timing sprocket 1 and intake camshaft 134 and which changes relative rotation phases of the both timing sprocket 1 and intake camshaft 134 according to a driving state of the engine.

Entire timing sprocket 1 is integrally formed of iron-based metal, and includes: a sprocket main body 1a of an annular shape which has an inner circumferential surface formed with a stepped diameter; and a gear part 1b which is integrally provided at outer circumference of sprocket main body 1a and which receives a rotating force from the crankshaft through a wound timing chain 42. Moreover, timing sprocket 1 is rotationally supported at intake camshaft 134 by a third ball bearing 43 as a third bearing fitted between a circular groove 1c formed on an inner circumferential side of sprocket main body 1a and outer circumference of a thick flange part 2a which is provided integrally at a front end part of intake camshaft 134.

Figure 5:
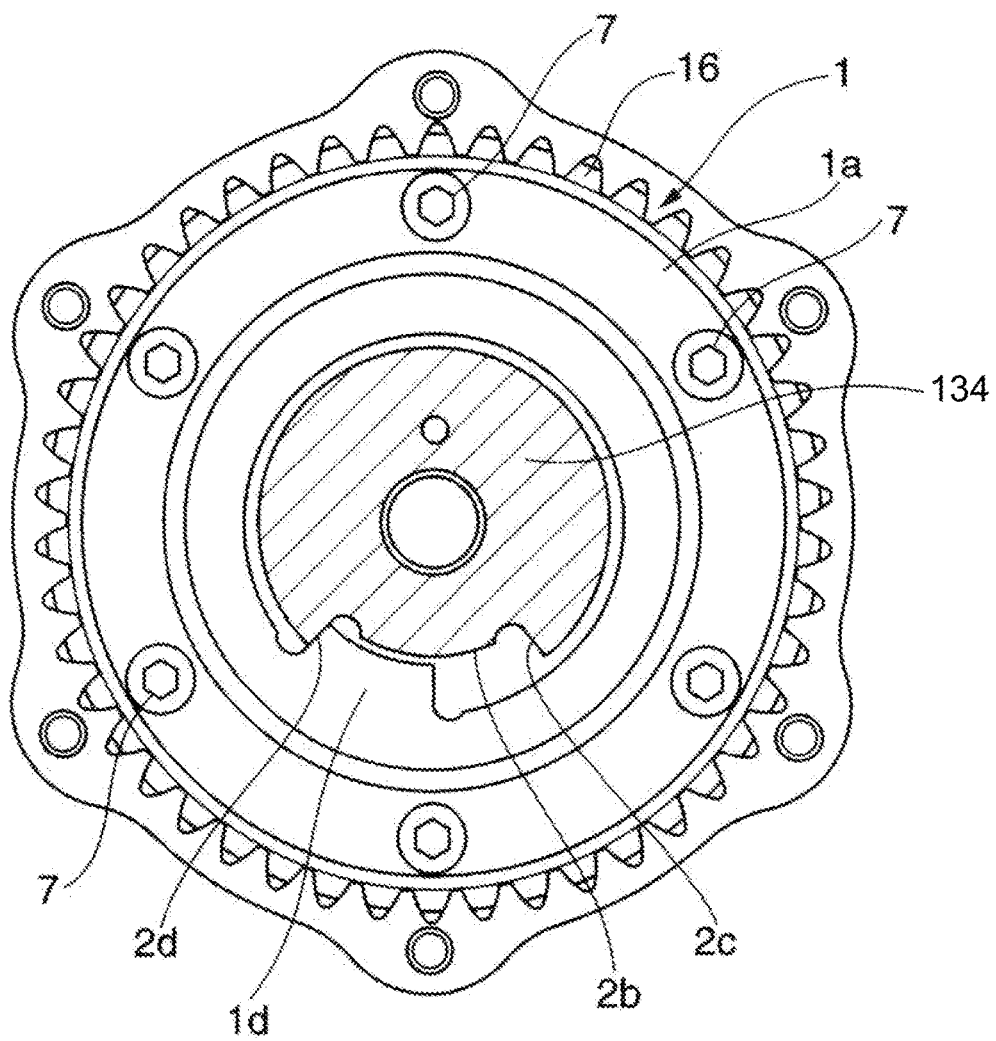
FIG. 5 is a sectional view taken along line B-B of FIG. 2.

An annular projection 1e is integrally formed at an outer circumferential edge of a front end part of sprocket main body 1a. An annular member 19 and a large diameter annular plate 6 are commonly fastened and fixed with bolt 7 in the axial direction at a front end part of sprocket main body 1a. Annular member 19 is coaxially positioned on an inner circumference side of annular projection 1e and has inner circumference formed with inner teeth 19a as a wave-shaped engagement part. Moreover, as illustrated in FIG. 5, a stopper convex part 1d as an arc-shaped engagement part is formed across a range of a predetermined length along a circumferential direction on part of the inner circumferential surface of sprocket main body 1a.

A cylindrical shaped housing 5, which is projected forward, is fixed at outer circumference of the plate 6 on a front end side with a bolt 11, in a state in which each configuration member (described below) of a reducer 8 and an electric motor 12 of phase changing mechanism 4 is covered.

Housing 5 is integrally formed of the iron-based metal and functions as a yoke, integrally has an annular plate-shaped holding part 5a on a front end side. The housing 5 is arranged in a manner such that an entire outer circumference side including the holding part 5a is covered by cover member 3 with a predetermined gap in between.

Intake camshaft 134 has two drive cams per cylinder which operate to open intake valve 105 at the outer circumference and also has a front end part axially coupled with a driven member 9 as a driven rotating body by a cam bolt 10. Moreover, as illustrated in FIG. 5, a stopper concave groove 2b as a locking part, into which stopper convex part 1d of sprocket main body 1a is inserted, is formed at flange part 2a of intake camshaft 134 along a circumferential direction. Stopper concave groove 2b is formed in an arc-shape having a predetermined length in the circumferential direction. Both end edges of stopper convex part 1d, which rotates over a range of the aforementioned length, respectively abut opposing edges 2c and 2d extending circumferentially to thereby regulate a relative rotation position on a maximum advance side or a maximum retard side of intake camshaft 134 with respect to timing sprocket 1.

Cam bolt 10 has: a seat part 10c of a flange shape integrally formed at an edge of a head part 10a on a shaft part 10b side; and a male screw part which is formed on outer circumference of shaft part 10b and which is screwed to a female screw part formed inside of intake camshaft 134 from an end part of intake camshaft 134 in an axial direction.

Figure 3:
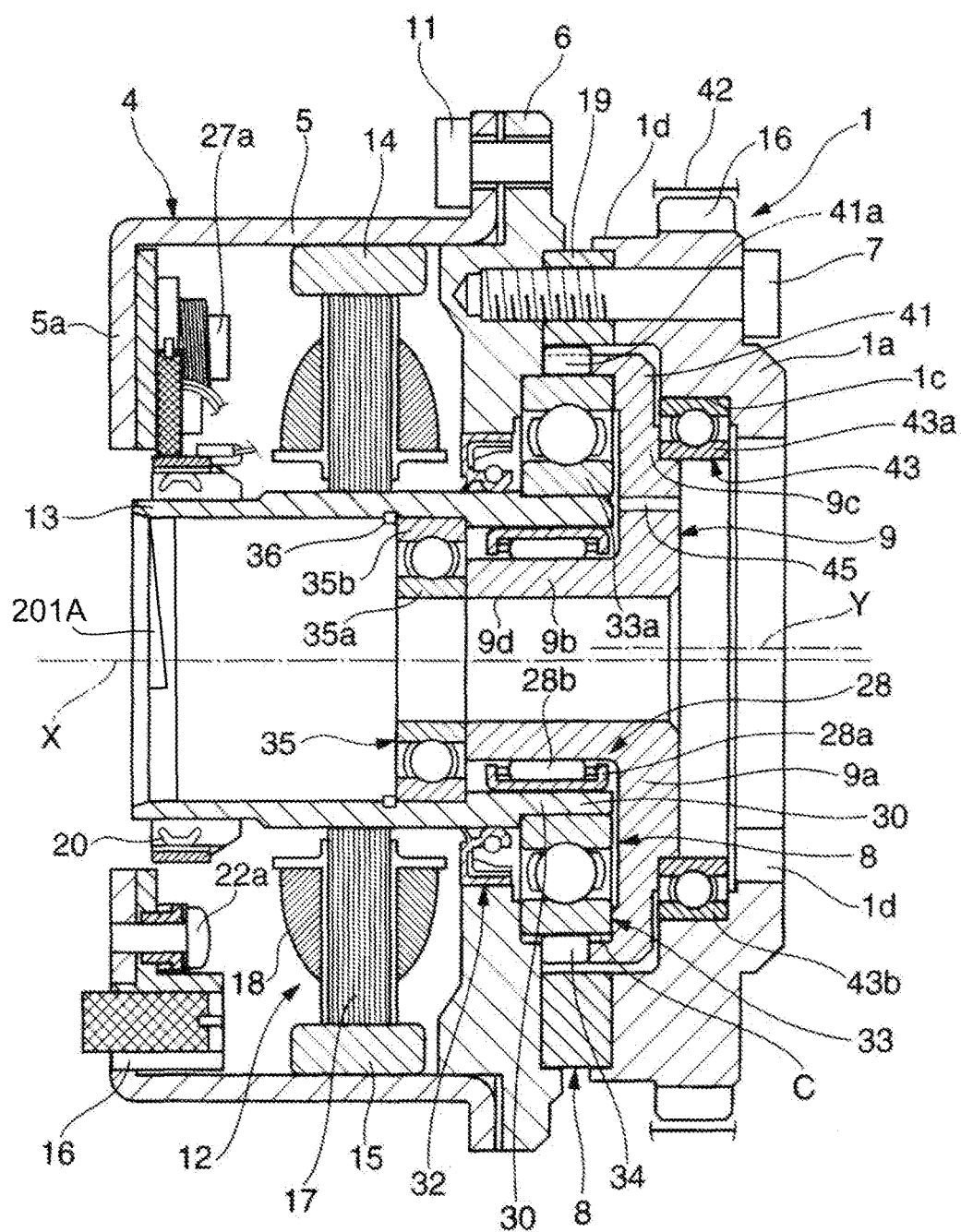
FIG. 3 is an enlarged sectional view of main component members in an electric variable valve timing mechanism.
Figure 4:
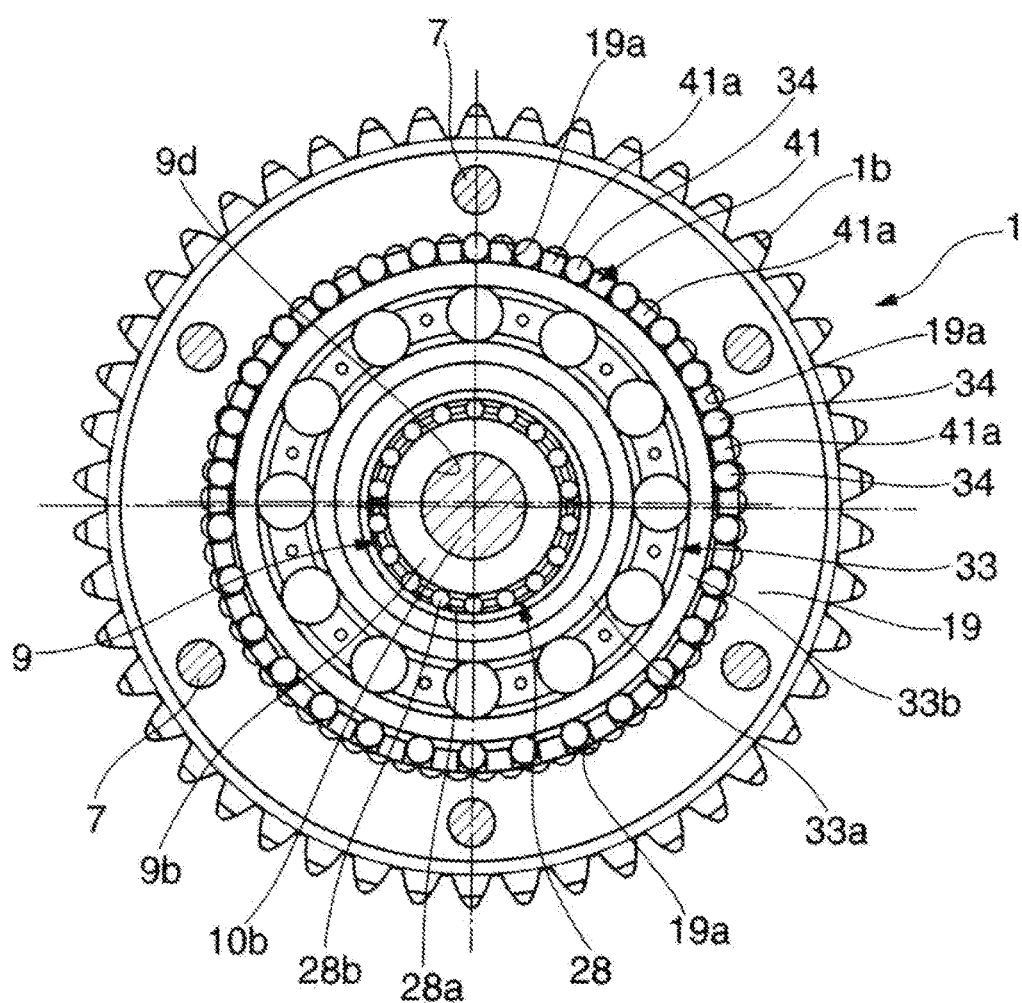
FIG. 4 is a sectional view taken along line A-A of FIG. 2.

Driven member 9 is integrally formed of iron-based metal, and as illustrated in FIG. 3, is configured of: a disc part 9a which is formed on a front end side; and a cylinder part 9b formed in a cylindrical shape which is integrally formed on a rear end side.

An annular stepped projection 9c, which has almost the same outer diameter as an outer diameter of the flange part 2a of intake camshaft 134, is integrally provided at a substantially central position in a radial direction of a rear end surface of disc part 9a. An outer circumferential surface of stepped projection 9c and an outer circumferential surface of flange part 2a are arranged in a manner such as to be inserted in inner circumference of an inner ring 43a of third ball bearing 43. Outer ring 43b of third ball bearing 43 is press-fitted on an inner circumferential surface of circular groove 1c of sprocket main body 1a.

Moreover, as illustrated in FIGS. 2 to 6, a holder 41, which holds a plurality of rollers 34 (described below), is integrally provided at an outer circumference part of disc part 9a. Holder 41 is formed in a manner such as to be projected from the outer circumference part of disc part 9a in the same direction as that of cylinder part 9b, and formed by a plurality of long and thin projection parts 41a located at substantially equal intervals in the circumferential direction with predetermined gaps therebetween.

Figure 2:
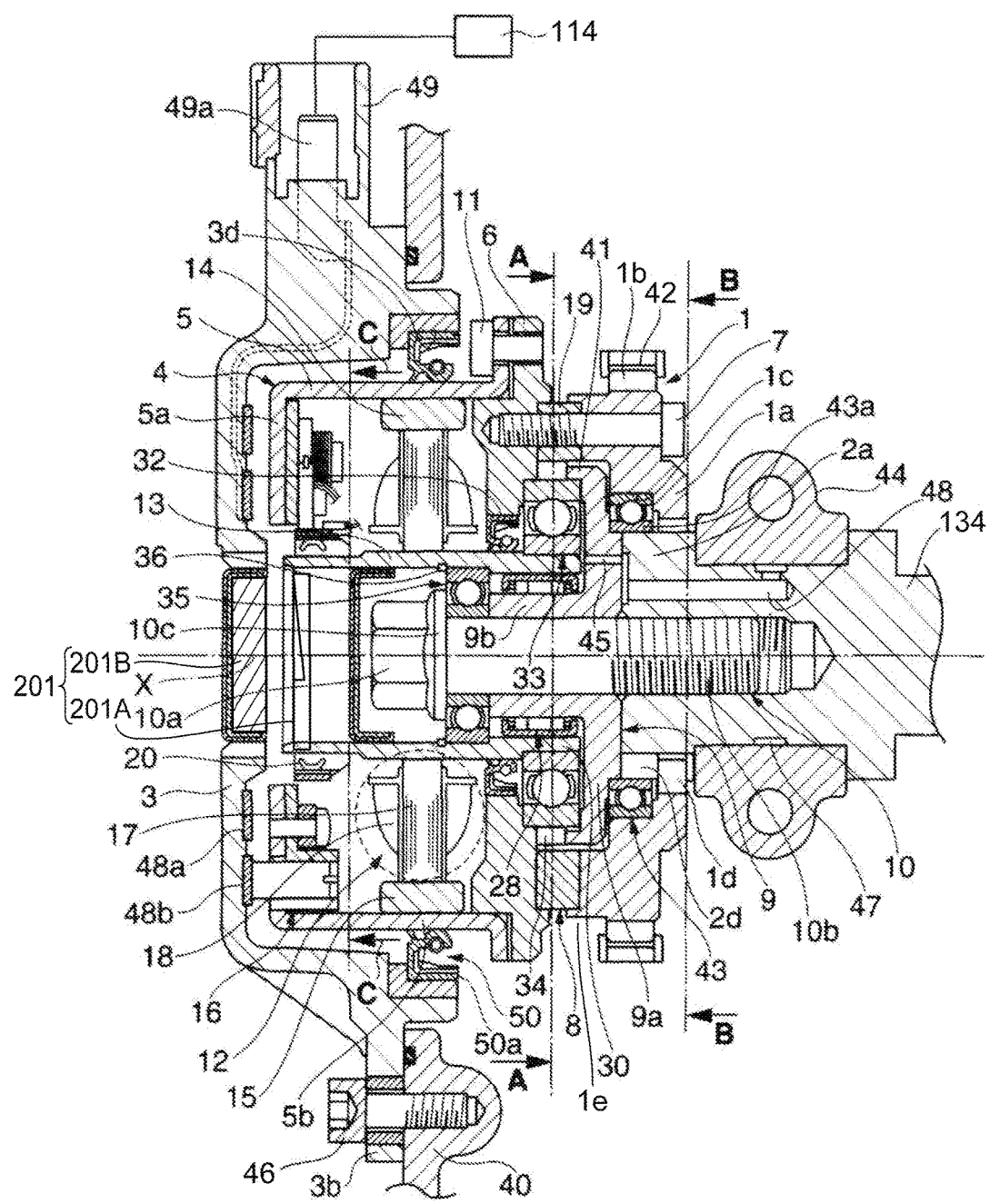
FIG. 2 is a longitudinal sectional view illustrating a variable valve timing mechanism according to the embodiments.

As illustrated in FIG. 2, cylinder part 9b has a through hole 9d which is formed at a center and through which shaft part 10b of cam bolt 10 penetrates, and also has a first needle bearing 28 (described below), as a first bearing formed on an outer circumference side.

Figure 6:
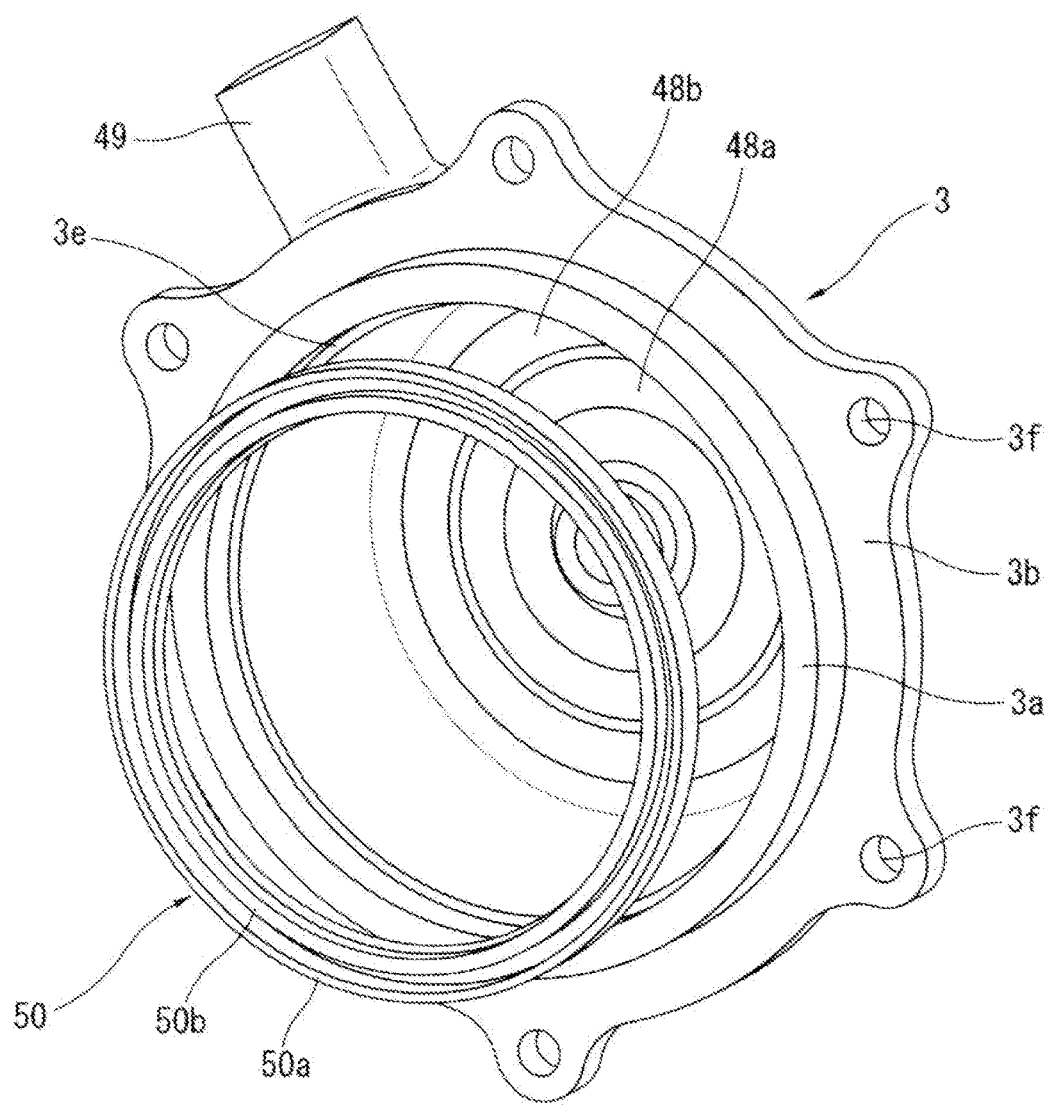
FIG. 6 is an exploded perspective view between a cover member and a first oil seal supplied to the same variable valve timing mechanism.

As illustrated in FIGS. 2 and 6, cover member 3 is integrally formed of a synthetic resin material with a relatively large thickness, and is configured of: a cover main body 3a which bulges in a cup shape; and a bracket 3b which is integrally formed on outer circumference of a rear end part of cover main body 3a.

Cover main body 3a is arranged in a manner such as to cover, with a predetermined gap in between, a front end side of phase changing mechanism 4, that is, an almost entire rear end part side from a holding part 5b of housing 5 in an axial direction. On the other hand, bracket 3b is formed with six boss parts of a substantially annular shape through which bolt through holes 3f are formed in a manner such as to respectively penetrate.

Moreover, as illustrated in FIG. 2, bracket 3b of cover member 3 is fixed to chain cover 40 via a plurality of bolts 46, and double, inner and outer slip rings 48a and 48b are fixed in a manner such as to be buried in the inner circumferential surface of front end part 3e of cover main body 3a while respective inner end surfaces are exposed. Further, an upper end part is provided with a connector part 49 in which a connecter terminal 49a connected to slip rings 48a and 48b via a conductive member is fixed. Note that connecter terminal 49a is configured such that power distribution from a battery power source, not illustrated, via an ECU 114 is performed or blocked.

Then as illustrated in FIG. 2, a first oil seal 50 having a large diameter as a seal member is fitted between the inner circumferential surface at a rear end part side of cover main body 3a and an outer circumferential surface of housing 5. First oil seal 50 is formed into a substantially U-shape in cross-section thereof, and has a base material of synthetic rubber in which core metal is buried and also has an annular base part 50a on an outer circumference side firmly mated in a circular groove 3d formed on the inner circumferential surface of the rear end part of cover main body 3a. Moreover, a seal surface 50b which abuts the outer circumferential surface of housing 5 is integrally formed on an inner circumference side of annular base part 50a.

Phase changing mechanism 4 is configured of: electric motor 12 which is almost coaxially arranged on a front end side of intake camshaft 134; and reducer 8 which reduces a rotation speed of electric motor 12 and transmits the rotation speed to intake camshaft 134.

As illustrated in FIGS. 2 and 3, electric motor 12 is a brush-fitted DC motor and includes: housing 5 as a yoke which integrally rotates with timing sprocket 1; a motor shaft 13 as an output shaft which is rotatably provided inside housing 5; a pair of semicircular permanent magnets 14 and 15 which are fixed at an inner circumferential surface of housing 5; and a stator 16 which is fixed to an inner bottom surface side of holding part 5a of the housing.

Motor shaft 13 is formed in a cylindrical shape and functions as an armature. An iron core rotor 17 with a plurality of poles is fixed at outer circumference of the substantially center position of motor shaft 13 in the axial direction and an electromagnetic coil 18 is wound around outer circumference of iron core rotor 17. Moreover, a commutator 20 is firmly press-fitted at the outer circumference of the front end part of motor shaft 13. Electromagnetic coil 18 is connected to each segment of commutator 20 obtained through division into the same number as a number of the poles of iron core rotor 17.

Figure 7:
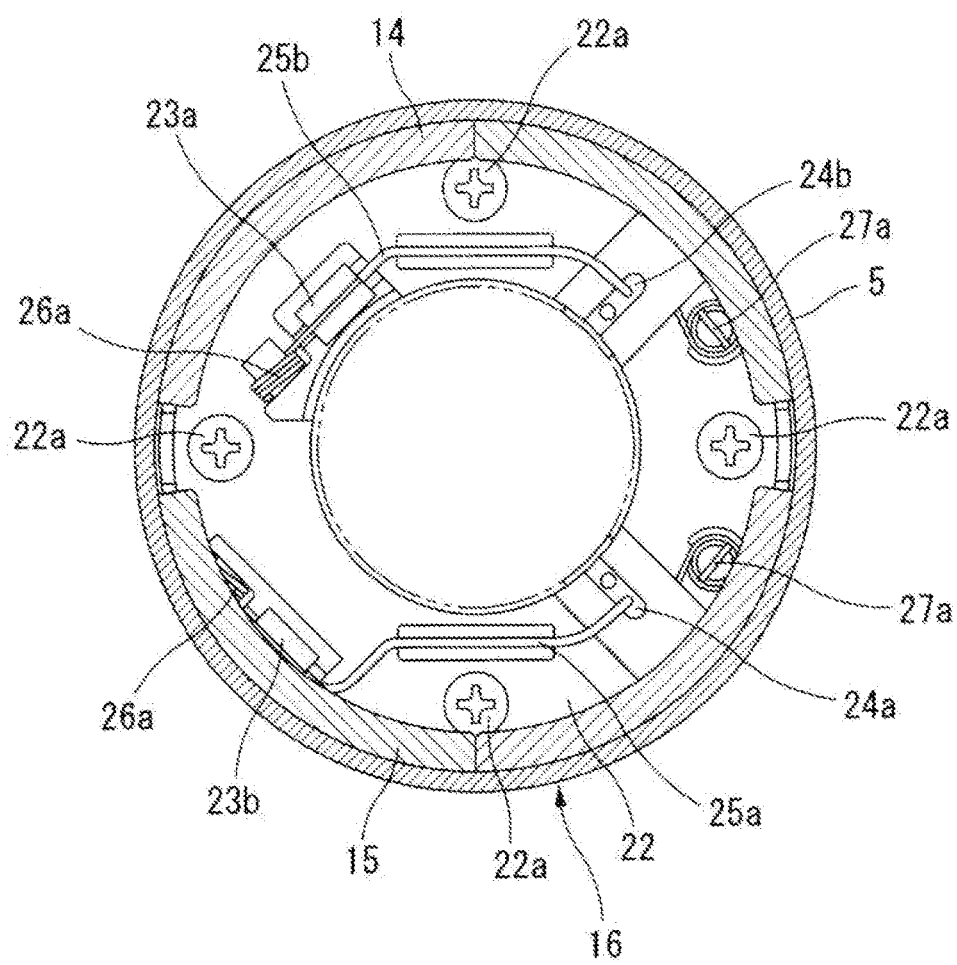
FIG. 7 is a sectional view taken along line C-C of FIG. 2.

As illustrated in FIG. 7, stator 16 is mainly configured of: a disk-shaped resin holder 22 which is fixed at an inner bottom wall of holding part 5a with four screws 22a; two inside and outside first brushes 23a and 23b in the circumferential direction which are arranged to penetrate resin holder 22 and holding part 5a in the axial direction; and second brushes 24a and 24b which are held in a manner such as to be advanceable and retractable inward towards an inner circumference side of resin holder 22. Each front end surfaces of first brushes 23a and 23b makes sliding contact with the pair of slip rings 48a and 48b to receive power supply. Circular front end portions of second brushes 24a and 24b make sliding contact with an outer circumferential surface of commutator 20.

First brushes 23a and 23b and second brushes 24a and 24b are connected to each other by pig tail harnesses 25a and 25b, and are biased towards slip rings 48a and 48b and towards commutator 20 by spring forces of torsion bars 26a and 27a respectively in elastic contact.

Motor shaft 13 is rotatably supported to an outer circumferential surface of shaft part 10b on a head part 10a side of cam bolt 10 via needle bearing 28 as a first bearing and a fourth ball bearing 35 as a bearing which is arranged at the side portion in the axial direction of needle bearing 28. Moreover, a cylindrical eccentric shaft part 30, which forms part of reducer 8, is integrally provided at a rear end part of intake camshaft 134 side of motor shaft 13.

First needle bearing 28 is configured of: a cylindrical retainer 28a which is press-fitted on an inner circumferential surface of eccentric shaft part 30; and needle rollers 28b as a plurality of rolling elements which are rotatably held inside retainer 28a. Needle rollers 28b make rolling motion on an outer circumferential surface of cylinder part 9b of driven member 9.

Fourth ball bearing 35 has an inner ring 35a which is fixed in a manner such as to be sandwiched between a front edge of cylinder part 9b of driven member 9 and seat part 10c of cam bolt 10, and fourth ball bearing 35 has an outer ring 35b which is supported in a manner such as to be axially positioned between a step part formed on inner circumference of motor shaft 13 and a snap ring 36 as a lockout ring.

Moreover, a second oil seal 32 as a friction member which blocks leakage of lubricating oil from the inside of reducer 8 into electric motor 12 is provided between an outer circumferential surface of motor shaft 13 (eccentric shaft part 30) and an inner circumferential surface of plate 6. Second oil seal 32 has an inner circumferential part elastically in contact with the outer circumferential surface of motor shaft 13 to thereby provide frictional resistance against rotation of motor shaft 13.

As illustrated in FIGS. 2 and 3, reducer 8 is mainly configured of: eccentric shaft part 30 which performs eccentric rotary motion; a second ball bearing 33 as a second bearing which is provided at outer circumference of eccentric shaft part 30; roller 34 which is provided at outer circumference of second ball bearing 33; holder 41 which allows moving of roller 34 in the radial direction while holding roller 34 in a rolling direction; and driven member 9 which is integrally formed with holder 41.

In eccentric shaft part 30, a shaft center Y of a cam surface formed on the outer circumferential surface is slightly eccentric in a radial direction from a shaft center X of motor shaft 13. Note that second ball bearing 33, roller 34, etc. are configured as a planetary meshing part.

Second ball bearing 33 is formed in a large diameter shape and the entire second ball bearing 33 is arranged at a position in the radial direction of first needle bearing 28 in an overlapped state. Also, second ball bearing 33 has an inner ring 33a which is firmly press-fitted on the outer circumferential surface of eccentric shaft part 30 and also has an outer ring 33b of which an outer circumferential surface is constantly abutted by roller 34. Moreover, an annular gap C is formed on an outer circumference side of outer ring 33b, and the gap C permits entire second ball bearing 33 to move, that is, make eccentric movement in a radial direction following eccentric rotation of eccentric shaft part 30.

Each roller 34 engages with internal teeth 19a of annular member 19 while moving in a radial direction following the eccentric movement of second ball bearing 33, and also makes oscillating movement in a radial direction while being guided in the circumferential direction by a projection part 41a of holder 41.

Lubricating oil is supplied into reducer 8 by lubricating oil supply means. As illustrated in FIG. 2, the lubricating oil supply means is configured of: an oil supply passage 47 which is formed inside bearing 44 of the cylinder head and through which lubricating oil is supplied from a main oil gallery, not illustrated; an oil supply hole 48 which is formed inside intake camshaft 134 in the axial direction and which communicates with oil supply passage 47 via a groove; an oil supply hole 45 which is formed to penetrate driven member 9 inside thereof in an axial direction and has a small diameter, of which an end is opened to oil supply hole 48 and the other end is opened to near first needle bearing 28 and second ball bearing 33; and three large diameter oil discharge holes, not illustrated, which are formed to penetrate driven member 9 in the same manner.

Hereinafter, operation of electric VTC 113 will be described. First, when the crankshaft of the engine has been driven into rotation, timing sprocket 1 rotates via timing chain 42, and a force of the aforementioned rotation causes synchronous rotation of electric motor 12 via housing 5, annular member 19, and plate 6. On the other hand, a rotation force of annular member 19 is transmitted from roller 34 to intake camshaft 134 via holder 41 and driven member 9. Consequently, a cam of intake camshaft 134 opens and closes the intake valve.

Thus, when electric VTC 113 is driven and then the rotation phase (valve timing of intake valve 105) of intake camshaft 134 is changed, electromagnetic coil 18 of electric motor 12 is conducted from ECU 114 via slip rings 48a and 48b, etc. Consequently, motor shaft 13 is driven into rotation, and a rotational force which is reduced via reducer 8 is transmitted to intake camshaft 134.

Specifically, when eccentric shaft part 30 is eccentrically rotated due to the rotation of motor shaft 13, each roller 34 is guided by projection part 41a of holder 41 in the radial direction for each rotation of motor shaft 13. Each roller 34 moves through one internal teeth 19a of annular member 19, thereby moves while rolling to another adjacent internal teeth 19a and rolling in a circumferential direction while sequentially repeating the aforementioned procedures. The rotation force is transmitted to driven member 9 while reducing the rotation speed of motor shaft 13 through the aforementioned rolling contact of each roller 34. It is possible to arbitrarily set a reduction ratio at the present point, depending on, for example, a number of rollers 34.

Consequently, intake camshaft 134 makes forward and reverse relative rotation with respect to timing sprocket 1, and a relative rotation phase is converted to perform control of converting intake valve opening and closing timing towards an advance side or a retard side.

Then maximum position regulation (angular position regulation) of the forward and reverse relative rotation of intake camshaft 134 with respect to timing sprocket 1 is performed by abutting of each side surface of stopper convex part 1*d* against either one of opposing surfaces 2*c* and 2*d* of stopper concave groove 2*b*.

Specifically, driven member 9 rotates in the same direction as the rotation direction of timing sprocket 1 following the eccentric rotation of eccentric shaft part 30, whereby one side surface of stopper convex part 1*d* abuts on opposing surface 2*c* of one side of stopper concave groove 2*b* to thereby regulate further rotation in the same direction. Consequently, the relative rotation phase of intake camshaft 134 with respect to timing sprocket 1 is changed to a maximum on the advance side.

On the other hand, driven member 9 rotates in a direction opposite to the rotation direction of timing sprocket 1, whereby another side surface of stopper convex part 1*d* abuts on opposing surface 2*d* of another side of stopper concave groove 2*b* to thereby regulate further rotation in the same direction. Consequently, the relative rotation phase of intake camshaft 134 with respect to timing sprocket 1 is changed to a maximum on the retard side.

Returning to FIG. 1, ECU 114 has a built-in microcomputer, and performs calculation according to a program previously stored in a memory, and controls electronically controlled throttle 103, fuel injection valve 131, ignition module 112, etc.

ECU 114 inputs detection signals from the various sensors. The various sensors provided include: an accelerator opening sensor 116 which detects opening (accelerator opening) ACC of an accelerator pedal 116*a*; an air flow sensor 115 which detects an amount of intake air Q in internal combustion engine 101; a crank angle sensor (rotation sensor) 117 which outputs a pulsed rotation signal (unit crank angle signal) POS according to rotation of crankshaft 120 as an output shaft of internal combustion engine 101; a throttle sensor 118 which detects opening TVO of throttle valve 103*b*; a water temperature sensor 119 which detects temperature TW of cooling water of internal combustion engine 101; a cam sensor 133 which outputs a pulsed cam signal PHASE according to the rotation of intake camshaft 134; a motor rotation sensor 201 which detects a motor shaft rotation angle of the electric motor driving electric VTC 113; a brake switch 122 which is turned on in a braking state in which a driver of the vehicle steps on a brake pedal 121; a vehicle speed sensor 123 which detects a running speed (vehicle speed) VSP of the vehicle having internal combustion engine 101 as a power source; etc.

Further, ECU 114 inputs on and off signals of an ignition switch 124 as a main switch for operating and stopping internal combustion engine 101 and on and off signals of a starter switch 125.

Figure 8:
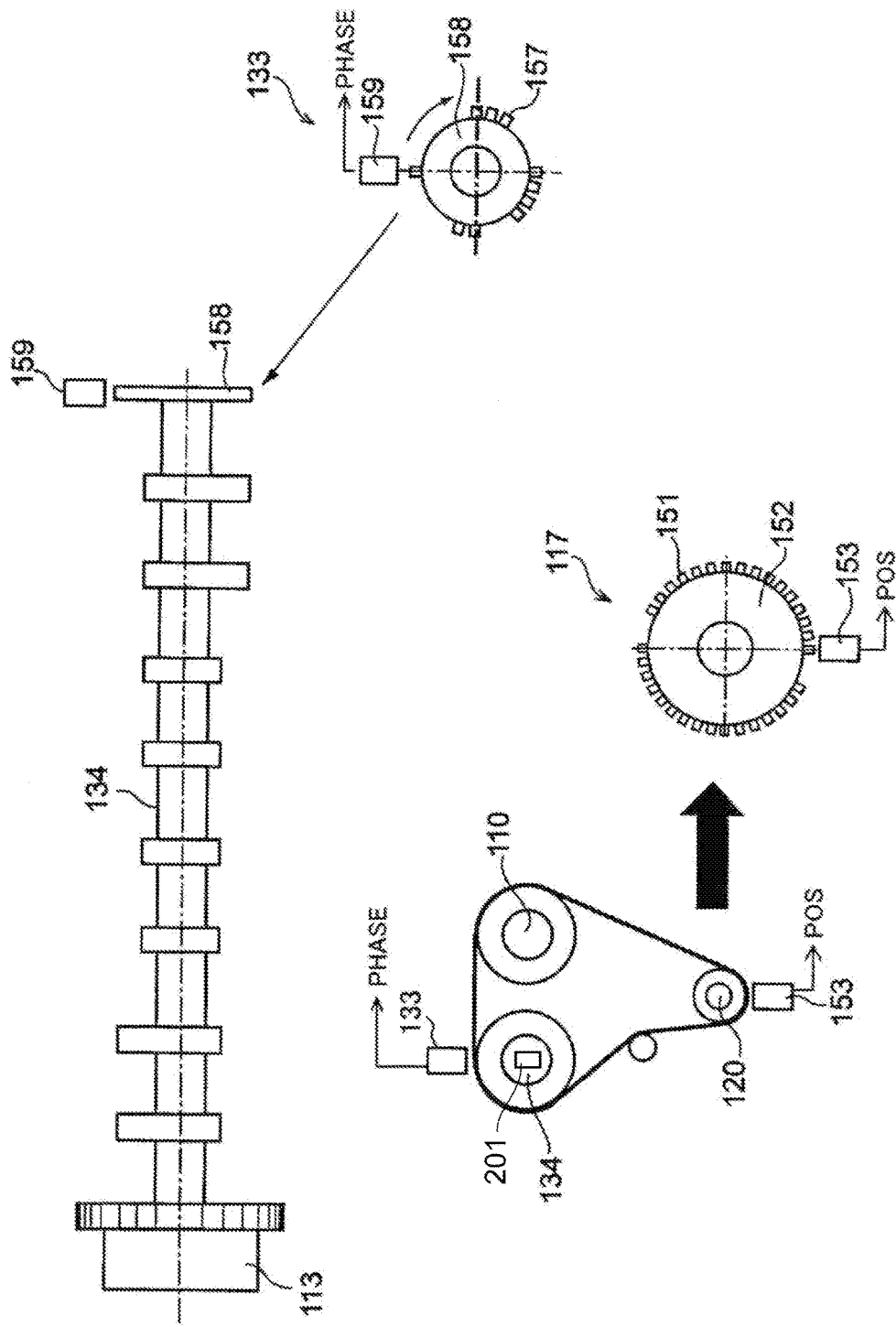
FIG. 8 is a view illustrating structures of a crank angle sensor and a cam sensor according to the embodiments.

FIG. 8 illustrates structures of crank angle sensor 117 and cam sensor 133.

Crank angle sensor 117 is configured of: a signal plate 152 which is pivotably supported at crankshaft 120 and around which projection parts 151 as detected parts are included; and a rotation detection device 153 which is fixed on an internal combustion engine 101 side and which detects projection part 151 and outputs a rotation signal POS.

Rotation detection device 153 includes various processing circuits including a waveform generating circuit, a selection circuit, etc. together with a pickup which detects projection parts 151. The rotation signal POS outputted by rotation detection device 153 is a pulse signal formed of a pulse train which is usually at a low level but changes to a high level for a given time period when projection parts 151 are detected.

Projection parts 151 of signal plate 152 are formed at equal intervals with a pitch of 10 degrees in crank angle, and a portion missing two successive projection parts 151 is formed at two opposing portions with a rotation center of crankshaft 120 in between.

Note that a number of missing projection parts 151 may be one or three or more in succession.

Figure 9:
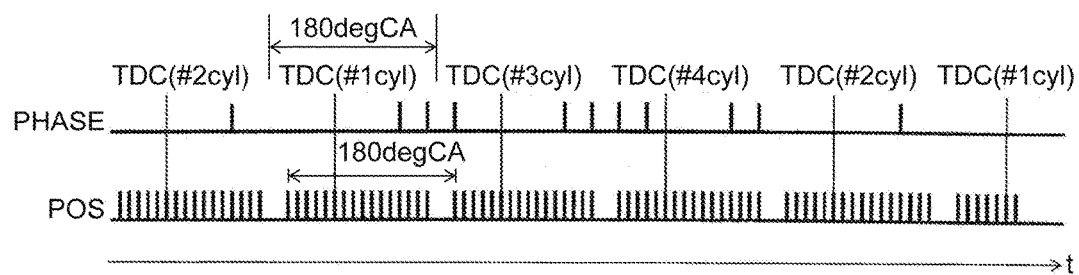
FIG. 9 is a time chart illustrating output characteristics of the crank angle sensor and the cam sensor according to the embodiments.

With the aforementioned structures, as illustrated in FIG. 9, the rotation signal POS outputted by crank angle sensor 117 (rotation detection device 153) makes a change to a high level 16 times in succession every ten degrees in crank angle (unit crank angle), holds at a low level for 30 degrees, and then makes a change to a high level 16 times in succession again.

Therefore, the first rotation signal POS after the low-level period (a toothless region, a missing portion) of 30 degrees in crank angle is outputted at an interval of 180 degrees in crank angle, and 180 degrees in crank angle corresponds to a stroke phase difference, in other words, an ignition interval between the cylinders in four-cylinder engine 101 of the present embodiment.

Moreover, in the present embodiment, crank angle sensor 117 is set to output, at a piston position of 50 degrees before a top dead center (BTDC 50 degrees) of each cylinder, the first rotation signal POS after the low-level period (the toothless region) at 30 degrees in crank angle.

On the other hand, cam sensor 133 is configured of: a signal plate 158 which is pivotably supported at an end part of intake camshaft 134 and around which a projection part 157 as a detected part is included; and a rotation detection device 159 which is fixed on the internal combustion engine 101 side and which detects projection part 157 and outputs a cam signal PHASE.

Rotation detection device 159 includes, together with the pickup which detects projection part 157, various processing circuits including, for example, a waveform sharpening circuit. One, three, four, and two projection parts 157 of signal plate 158 are respectively provided at four portions provided at every cam angle of 90 degrees, and a pitch of projection parts 157 is set at 30 degrees in crank angle (15 degrees in cam angle) at a portion where the plurality of projection parts 157 is provided in succession.

Then as illustrated in FIG. 9, the cam signal PHASE outputted by cam sensor 133 (rotation detection device 159) is a pulse signal formed of a pulse train which is usually at a low level but changes to a high level for a given time period as a result of detection of projection part 157, and one single signal, three successive signals, four successive signals, and two successive signals change to a high level at every 90 degrees in cam angle and every 180 degrees in crank angle.

Moreover, the single alone cam signal PHASE and the head signal of the plurality of cam signals PHASE outputted successively are outputted at intervals of 180 degrees in crank angle. Also, output patterns of one single signal, the three successive signals, the four successive signals, and the two successive signals are such that each of the signals is outputted between a top dead center TDC of the given cylinder and a top dead center TDC of the next cylinder. Note that output positions and output intervals of the cam signal PHASE are set in view of a valve timing change range so that a change in the valve timing of intake valve 105 by electric VTC 113 does not cause the output position of the cam signal PHASE to change across top dead center TDC.

More specifically, it is set that the three successive cam signals PHASE are outputted between the compression top dead center TDC of the first cylinder and a compression top dead center TDC of the third cylinder, the four successive cam signals PHASE are outputted between the compression top dead center TDC of the third cylinder and a compression top dead center TDC of the fourth cylinder, the two successive cam signals PHASE are outputted between the compression top dead center TDC of the fourth cylinder and a compression top dead center TDC of the second cylinder, and one single cam signal PHASE is outputted between the compression top dead center TDC of the second cylinder and a compression top dead center TDC of the first cylinder.

A number of cam signals PHASE outputted successively between the top dead centers TDC indicates a cylinder number serving as the cylinder which has the next compression top dead center. It is indicated that, for example, in a case where three successive cam signals PHASE are outputted between the current top dead center TDC and the last top dead center TDC, the current top dead center TDC is the compression top dead center TDC of the third cylinder.

Ignition is performed in order of the first cylinder, the third cylinder, the fourth cylinder, and the second cylinder in four-cylinder engine 101 of the present embodiment, and thus, as illustrated in FIG. 3, output patterns of the cam signals PHASE outputted between the top dead centers TDC are set in order of one single signal, three successive signals, four successive signals, and two successive signals.

ECU 114 determines, for example, a toothless portion of the rotation signal POS based on, for example, a periodical change of the rotation signal POS and counts a number of generated rotation signals POS with reference to the aforementioned toothless position to thereby detect the top dead center TDC (reference crank angular position). In the present embodiment, the rotation signal POS outputted at the sixth time after the toothless region of the rotation signal POS corresponds to the top dead center TDC of each cylinder.

Then by counting the number of cam signals PHASE outputted between the top dead centers TDC, ECU 114 determines the cylinder whose piston position is to be located at the compression top dead center TDC next time (predetermined piston position), and also counts a number of generated rotation signals POS from the top dead center TDC to detect a current crank angle based on the aforementioned count value CNTPOS.

When the cylinder at the top dead center TDC and the crank angle are detected, ECU 114 determines the cylinder with which fuel injection and ignition are to be performed, and further fuel injection timing and ignition timing, and outputs an injection pulse signal and an ignition control signal according to an angle of crankshaft 120 (crank angle) detected based on the aforementioned count value CNTPOS.

A result of the determination of the cylinder whose piston position is to be located at the compression top dead center TDC (predetermined piston position) is updated along the ignition order, so that counting the number of cam signals PHASE outputted between the top dead centers TDC permits the cylinder of the top dead center TDC to be updated along the ignition order for each top dead center TDC after the determination of the cylinder whose piston position is to be located at the compression top dead center TDC next time (predetermined piston position).

Note that a zone in which the number of generated cam signals PHASE is counted is not limited to an area between the top dead centers TDC, and it is possible to provide a desired crank angle (piston position) as a reference for the zone in which the number of generated cam signals PHASE is counted.

Further, instead of the determination based on the number of generated cam signals PHASE, it is possible to determine the cylinder whose piston position is located at the predetermined position based on, for example, a difference in a pulse width of the cam signal PHASE.

Moreover, it is possible in the present embodiment to detect an angular position (crank angle) of crankshaft 120 with reference to a missing position which is provided by partially missing the pulse train of the rotation signal POS. However, it is also possible to detect the angular position (crank angle) of crankshaft 120 by outputting the rotation signal POS every 10 degrees without missing the rotation signal POS, and alternatively providing a reference position sensor which generates a signal at the reference crank angular position every 180 degrees in crank angle and counting the rotation signal POS with reference to an output signal of the aforementioned reference position sensor.

Moreover, it is also possible to detect the rotation phase (actual valve timing of intake valve 105) of intake camshaft 134 with respect to crankshaft 120, which is changed by electric VTC 113, by counting the number of generated rotation signals POS from the reference crank angular position to the single alone cam signal PHASE or the head signal of the plurality of cam signals PHASE outputted successively, which permits feedback control to be performed in a manner such as to bring the valve timing closer to a target value, based on the aforementioned detection value.

Moreover, a motor rotation sensor (actuator rotation sensor) 201 is arranged in electric VTC 113. Motor rotation sensor 201 is capable of detecting, with a high detection frequency, a motor shaft rotation angle (an amount of rotational operation) of a driving electric motor (actuator) as a second driving source, including a rotation direction, at given timing.

Figure 10:
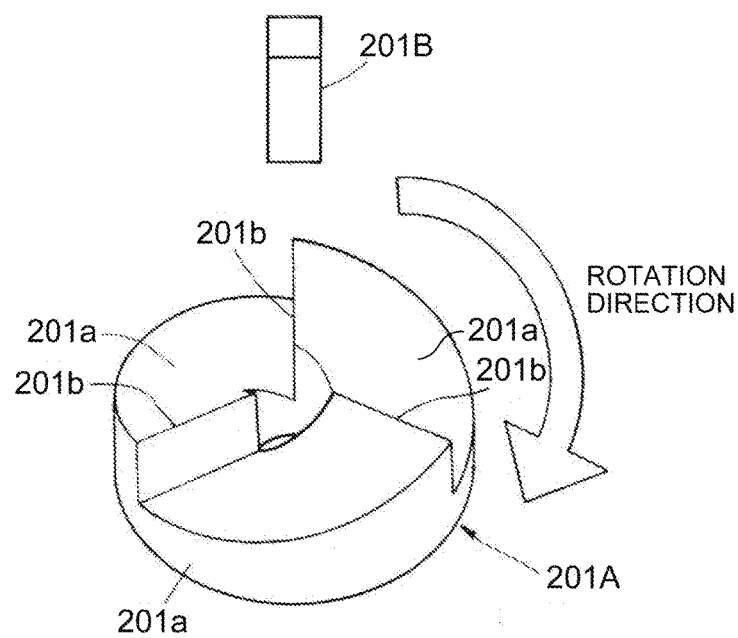
FIG. 10 is a perspective view illustrating configuration of a motor rotation sensor used in the embodiments.

As illustrated in FIG. 10, motor rotation sensor 201 is configured of: a detected part 201A; and a rotation angle detection section 201B as a gap sensor which detects displacement of a rotation direction of detected part 201A.

As illustrated in FIGS. 2 and 3, detected part 201A is fixed in a manner such as to be fitted in a front edge of motor shaft 13. As illustrated in FIG. 2, rotation angle detection section 201B is fixed in a manner such as to be fitted in a hole formed through a portion opposing a front of detected part 201A of cover member 3.

As illustrated in FIG. 10, detected part 201A is formed into a three-dimensional shape, and has three axially projected target parts which are circumferentially formed at equidistant positions. Each of the aforementioned target parts is configured of: inclined parts 201a which have an end surface opposing rotation angle detection section 201B circumferentially formed into an arc shape; and edge parts 201b which are linearly steepened in an axial direction and a radial direction from an edge of inclined part 201a.

Each inclined part 201a is formed in downward slope from one end side in which edge parts 201b is the top point to the other end side at a predetermined angle in clockwise direction, so that the position detected by rotation angle detection section 201B continuously varies. On the other hand, each edge part 201b is formed in a manner such as to be steepened along the radial direction and is formed into a flat plane in the axial direction from one end of inclined part 201a, so that the detection position varies not continuously.

Figure 11A:
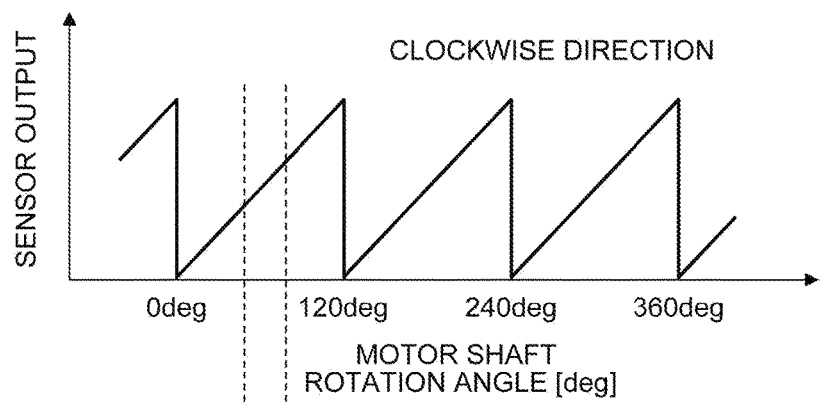
FIGS. 11A and 11B are waveform diagrams of signals outputted from the motor rotation sensor.
Figure 11B:
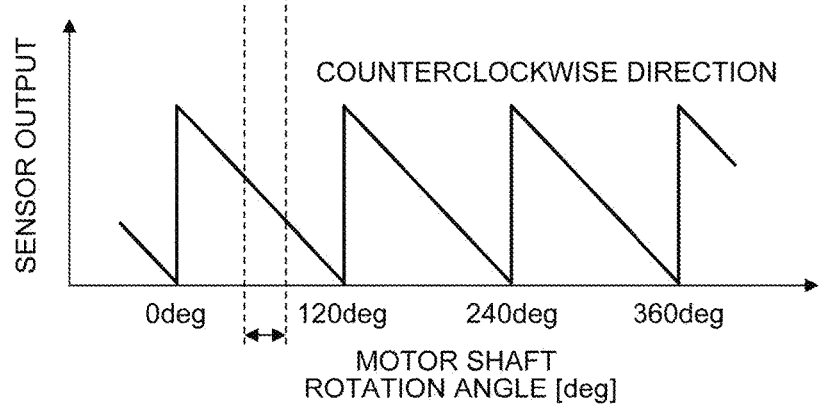

Rotation angle detection section 201B is of an electromagnetic pickup type, and detects inclined part 201a and edge parts 201b of opposing detected part 201A to thereby output a waveform signal of a continuously stepped shape (saw blade shape), as illustrated in FIGS. 11A and 11B.

Specifically, when motor shaft 13 rotates in a clockwise direction, a waveform signal (FIG. 11A) is provided in which output during detecting inclined part 201a gradually increases and output upon detection of edge parts 201b steeply falls. When motor shaft 13 rotates in a counterclockwise direction, the output during detecting inclined part 201a gradually decreases and the output upon the detection of edge parts 201b steeply rises (FIG. 11B).

Using the aforementioned characteristics, when the output gradually increases, the angle at which motor shaft 13 rotates in a clockwise direction (for example, an advance direction) is gradually increased according to the aforementioned gradual increase in the output, and when the output gradually decreases, the angle at which motor shaft 13 rotates in a counterclockwise direction (for example, a retard direction) is gradually increased according to the aforementioned gradual decrease in the output, thereby permitting linear detection of the rotation angle (amount of rotational operation) together with the rotation direction. Note that learning of an output value (output voltage) of the corresponding rotation angle upon the detection of edge parts 201b permits suppression of a detection error.

Figure 12A:
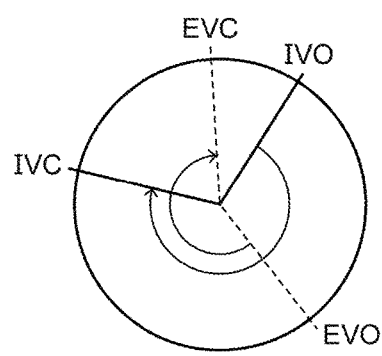
FIGS. 12A and 12B are valve timing controlled in the embodiments.

On the other hand, in the internal combustion engine according to the present embodiment, as illustrated in FIG. 12A, valve timing is set after starting so that closing time (IVC) of intake valve 105 is largely retarded (or advanced) with respect to intake bottom dead center (BDC) to thereby perform mirror (Atkinson) cycle operation, which makes an expansion ratio greater than an effective compression ratio of the cylinder. Consequently, knocking prevention performance is improved, achieving a fuel improvement.

Figure 12B:
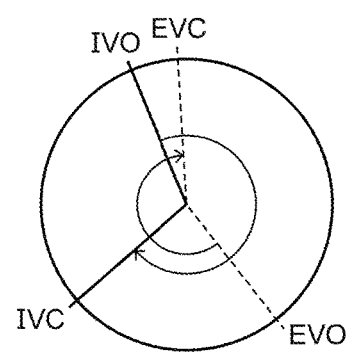

However, as a result of excessive retarding (or advancing) of the IVC during the starting, a cylinder air intake amount decreases, resulting in failure to provide favorable starting performance. Thus, during the starting, as illustrated in FIG. 12B, operation is performed in which valve timing control of decreasing the retard amount (advance amount) of the IVC closely to the BDC is performed to thereby increase the cylinder air intake amount, ensuring starting performance.

On the other hand, the rotation phase (rotation angular position) of intake camshaft 134 (second rotating body) with respect to crankshaft 120 (first rotating body) which is changed by electric VTC 113, that is, the valve timing of intake valve 105 is detected every inter-cylinder stroke phase difference based on the cam signal PHASE provided from cam sensor 133 and the rotation signal POS provided from crank angle sensor 117. Therefore, during extremely low engine rotation such as during starting (the cranking), a detection cycle of the rotation phase is larger than a control cycle of the feedback control, so that the detected value is not updated during a period from the previous control timing to the current control timing, during which it is also not possible to accurately detect the changed rotation phase.

Thus, while detecting the rotation phase of intake camshaft 134 with respect to crankshaft 120 at predetermined cycles based on: signals provided from cam sensor 133 and crank angle sensor 117 forming the rotation phase detection section (first rotation detection section), that is, the rotation angular position of crankshaft 120; and the rotation angular position of intake camshaft 134 which is rotated relatively to crankshaft 120 by electric motor 12 (actuator), and further while accurately detecting the valve timing of intake valve 105 at given timing during the starting by using the motor shaft rotation angle detection signal provided from motor rotation sensor 201 (second rotation detection section), ECU 114 basically performs advance control from the valve timing corresponding to the mirror cycle operation to the valve timing for starting.

More specifically, ECU 114 first calculates, based on an operation state of the internal combustion engine (the engine as a first driving source), a target VTC angle, that is, a target rotation phase of intake camshaft 134 (target valve timing of intake valve 105) controlled by electric VTC 113. Here, the target VTC angle is set at target valve timing for the mirror operation illustrated in FIG. 12A during the mirror cycle operation, but is switched to be set at target valve timing for starting illustrated in FIG. 12B during starting.

Next, the actual VTC angle, that is, the rotation phase of intake camshaft 134 is detected at predetermined cycles by using the rotation phase detection section, and when the actual VTC angle has been detected, ECU 114 obtains a final actual VTC angle as a detected actual VTC angle.

On the other hand, when the actual VTC angle has not been detected by the rotation phase detection section, the motor shaft rotation angle (amount of rotational operation) of the actuator, that is, a change angle (VTC change angle) of electric VTC 113 is detected as a relative change angle of intake camshaft 134 with respect to crankshaft 120 by motor rotation sensor 201 with a high detection frequency until the next actual VTC angle is detected.

Then ECU 114 sets, as an initial value, the previously obtained final actual VTC angle, and integrates, with the aforementioned initial value, the VTC change angle in a manner such as to interpolate a period until detection of the next actual VTC angle to thereby obtain a final actual VTC angle, and calculates a motor manipulated variable such that the aforementioned target VTC angle is followed by the actual VTC angle.

Consequently, electric VTC 113 drives electric motor 12 according to the aforementioned motor manipulated amount, so that the valve timing of intake valve 105 is controlled during the mirror cycle operation at valve timing for the mirror operation in which the IVC is sufficiently retarded, while the valve timing of intake valve 105 is controlled during the starting at the valve timing in which the IVC is advanced for starting.

Here, upon occurrence of abnormality even once in the rotation phase detection section which detects the aforementioned actual VTC angle, an erroneous actual VTC angle may be detected. Further, the detection cycle is long during extremely low engine rotation as described above, and the driving of electric motor 12 is continued according to a motor manipulated variable based on the erroneous actual VTC angle until detection of a normal actual VTC angle after recovery of the rotation phase detection section to be normal, whereby the valve timing is greatly overshot with respect to the target.

As a result, engine performance (low engine rotation performance in particular) is impaired, leading to a risk of secondary failure such as stopper durability deterioration and firm attachment to the stopper caused by strong abutting of the valve timing mechanism.

Moreover, conventional detection of abnormality in a rotation phase detection section is performed through determination whether or not a sequence of determining the cylinder whose piston position is located at the predetermined position based on a cylinder determination value such as the number of generated cam signals PHASE or a pulse width difference agrees with a sequence of the cylinders which are caused to perform fuel injection and ignition, that is, monitoring of the sequence of the cylinder determination values, thus requiring a long period from the abnormality occurrence to abnormality detection.

Therefore, as described above, until the detection of abnormality in the rotation phase detection section, the overshooting occurs due to the erroneous motor manipulated variable, and the engine performance is impaired, leading to the risk of secondary failure such as the stopper durability deterioration and the firm attachment.

Thus, in the present embodiment, presence or absence of any abnormality in either one of the rotation phase detection section and motor rotation sensor 201 is determined based on a change amount of the rotation phase detected at predetermined cycles by the rotation phase detection section and based on an integrated value, in the predetermined cycle, of the relative change angle detected by motor rotation sensor 201. More specifically, it is possible to quickly detect abnormality in the rotation phase detection section through determination that abnormality is present in the rotation phase detection section when an absolute value of a difference between the actual VTC angle detected by the rotation phase detection section and a value obtained by integrating the VTC change angle detected by motor rotation sensor 201 with the previously detected final actual VTC angle is equal to or greater than a predetermined value.

Hereinafter, each embodiment of the abnormality detection performed by ECU 114 in FIG. 1 will be described.

In the present embodiment, when the feedback control is performed by using the target VTC for starting of the engine, based on the actual VTC angle detected by the rotation phase detection section during the starting of the engine and based on the VTC change angle detected by motor rotation sensor 201, the abnormality detection is performed based on the aforementioned two detection values.

Here, it is difficult to detect the actual VTC angle during non-rotation, and thus an initial value of the actual VTC angle during the starting is set according to the feedback control performed during engine stopping process before the starting. That is, when the feedback control has been performed by using the target VTC for the mirror cycle operation during the engine stopping process, it is determined that the actual VTC angle is brought closer to the target VTC during stopping of the engine, and an initial value of the actual VTC angle during the starting is set at the same value as a value of the target VTC for the mirror cycle operation.

Then, the feedback control is started by using the initial value of the abovementioned actual VTC angle and the advanced target VTC for the starting. Here, until the actual VTC angle is first detected in the rotation phase detection section, the feedback control is performed while updating the actual VTC angle to a value obtained by integrating, with the initial value, the VTC change angle detected by motor rotation sensor 201 (the integrated value of the VTC change angle). Next, when the actual VTC angle has been detected in the rotation phase detection section, the actual VTC angle is replaced from the integrated value of the VTC change angle to the actual VTC angle detected in the rotation phase detection section. Next, the actual VTC angle is updated to the value obtained by integrating the VTC change angle with the actual VTC angle. Then, every time when the actual VTC angle is detected in the rotation phase detection section, updating is performed by replacing the detected value with the actual VTC angle while integrating the VTC change angle with the thus-obtained value, providing a final actual VTC angle.

As described above, use of the actual VTC angle estimated as the initial value from the beginning of the starting permits responsiveness during the starting to be ensured through the feedback control performed during the starting.

Note that it is also possible to perform feedback control in which the actual VTC angle during the stopping is brought closer to the target VTC for the starting by using the actual VTC angle detected in the rotation phase detection section and by using the VTC change angle detected by motor rotation sensor 201, at the time of extremely low engine rotation during stopping process, and the actual VTC angle during the starting is brought closer to the target VTC for the starting, which therefore makes it possible to provide favorable starting performance as quickly as possible since start of the feedback control.

On the other hand, the initial value of the actual VTC angle is an estimated value, and sufficient accuracy is hardly ensured in the actual VTC angle obtained before the first detection of the actual VTC angle by the rotation phase detection section after the feedback control is started. Therefore, performing detection of abnormality in rotation detection during the aforementioned period results in difficulties in ensuring the detection accuracy. Thus, the abnormality detection is stopped during the aforementioned period, and the abnormality detection is started after the first detection of the actual VTC angle by the rotation phase detection section.

Figure 13:
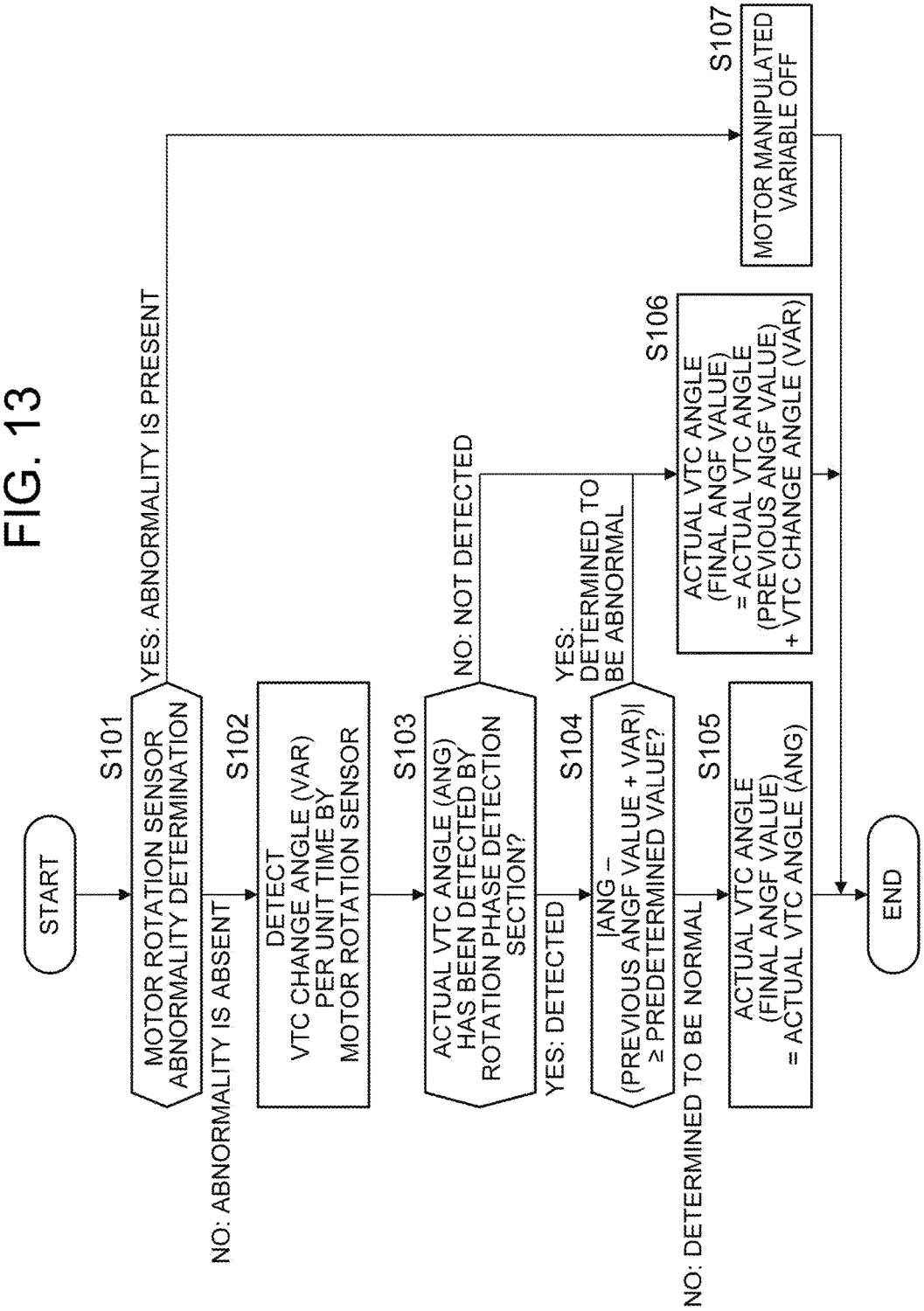
FIG. 13 is a flowchart illustrating abnormality detection processing according to the first embodiment performed when valve timing is controlled by the variable valve timing mechanism.

FIG. 13 illustrates a flow of abnormality detection processing performed according to the first embodiment, when the valve timing is controlled by the variable valve timing mechanism.

In step S101, ECU 114 determines presence or absence of abnormality in motor rotation sensor 201.

The detection of abnormality in motor rotation sensor 201 is performed by, for example, monitoring a sensor output range or a sensor output change amount.

Upon determination in step S101 that abnormality is present in motor rotation sensor 201, ECU 114 proceeds the processing to step S107, and turns off an output of the motor manipulated variable as a fail-safe control performed upon confirmation of the motor rotation sensor failure. Consequently, it is possible to suppress VTC driving based on the erroneous motor manipulated variable in an event of failure occurring in motor rotation sensor 201.

Upon determination in step S101 that abnormality is absent in motor rotation sensor 201, ECU 114 proceeds the processing to step S102, and detects a VTC change angle (VAR) per unit time by using motor rotation sensor 201.

In step S103, ECU 114 determines whether or not the actual VTC angle has been detected by the rotation phase detection section.

When the actual VTC angle has not been detected in step S103, ECU 114 proceeds the processing to step S106, integrates the VTC change angle (VAR) detected in step S102 with the previously obtained actual VTC angle (a previous ANGF value) to obtain a final actual VTC angle (a final ANGF value) for calculating the motor manipulated amount:

Final *ANGF* value=Previous *ANGF* value+*VAR*.

Consequently, even in a case where the cycle of the detection performed by the rotation phase detection section is long and the actual VTC angle is not detected, it is possible to calculate a motor manipulated variable such that the actual VTC angle follows the target VTC angle, so that the VTC driving control is continued.

Figure 14:
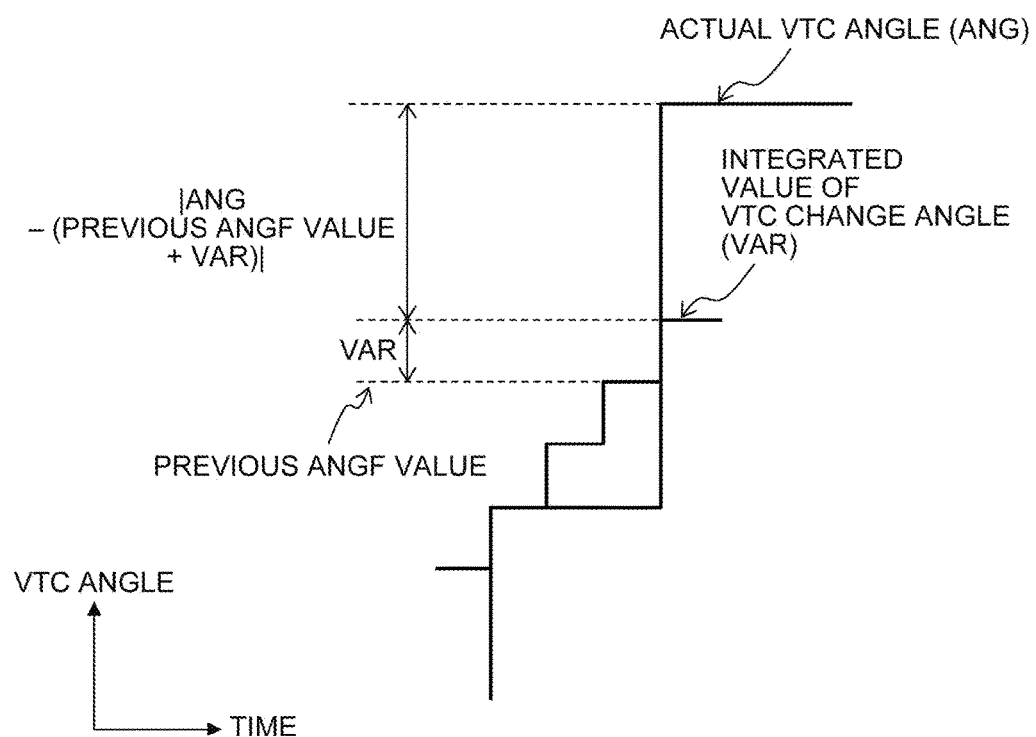
FIG. 14 is a time chart illustrating changes in various state quantities used when the valve timing is control.

On the other hand, upon detection of the actual VTC angle in step S103, ECU 114 proceeds the processing to step S104, and, as illustrated in FIG. 14, determines whether or not an absolute value of a difference between the detected actual VTC angle (ANG) and a value obtained by integrating the VTC change angle (VAR) detected in step S102 with the previously obtained actual VTC angle (the previous ANGF value) is equal to or greater than a predetermined value:

|ANG−(previous ANGF value+VAR)|≥Predetermined value

Specifically, in step S104, ECU 114 determines whether or not an absolute value of a difference between a change amount of the actual VTC angle (rotation phase) detected at predetermined cycles by the rotation phase detection section and a change amount of a rotation phase calculated based on an integrated value of the VTC change angle (relative change angle) in the predetermined cycle detected by motor rotation sensor 201 is equal to or greater than the predetermined value.

Here, in conventional valve timing feedback control, in order to eliminate any error caused by the integration with the actual VTC angle, the VTC change angle calculated by motor rotation sensor 201 interpolates the actual VTC angle during a period in which the actual VTC angle is not detected, as an amount of change from the previously obtained actual VTC angle (initial value). Upon detection of the current actual VTC angle, the motor manipulated variable is calculated based on the current actual VTC angle.

However, in an event of abnormality occurring in the rotation phase detection section, there is possibility that an erroneous actual VTC angle is detected, so that the VTC is driven according to the motor manipulated variable based on this erroneous actual VTC angle.

Therefore, until the rotation phase detection section recovers to be normal to detect a normal actual VTC angle since then, overshooting is caused by an erroneous motor manipulated variable such that the actual VTC angle largely exceeds a target angle, as a result of which the engine performance is impaired, leading to a risk of occurrence of the secondary failure such as the stopper durability deterioration and the firm attachment.

Thus, in the present embodiment, it is determined that abnormality is present in the rotation phase detection section, based on the absolute value of the difference described above, that is, in a case where the absolute value of the difference has become equal to or greater than the predetermined value (a threshold value for abnormality determination) after confirmation that motor rotation sensor 201 is normal.

Since it is determined in step S101 that abnormality is absent in motor rotation sensor 201 as described above, when the absolute value of the difference between the value obtained by integrating the VTC change angle (VAR) based on a signal provided from the aforementioned motor rotation sensor with the actual VTC angle (previous ANGF value) previously and normally obtained by the rotation phase detection section and the actual VTC angle (ANG) detected in step S103 is less than the predetermined value, it is possible to determine that abnormality is absent in the rotation phase detection section.

Upon determination in step S104 that the absolute value of the difference is equal to or greater than the predetermined value, ECU 114 proceeds the processing to step S106. In step S106, as the fail-safe control performed when abnormality is present in the rotation phase detection section, ECU 114 provides the final actual VTC angle as the value obtained by integrating the VTC change angle (VAR) detected in step S102 with the previously detected actual VTC angle (previous ANGF value) as described above.

Consequently, during a period from detection of the erroneous actual VTC angle as a result of occurrence of abnormality in the rotation phase detection section to recovery to a normal state, it is possible to quickly detect the abnormality to shift to the fail-safe control, which therefore makes it possible to continue normal VTC driving control.

As a result, it is possible to avoid calculation of an erroneous motor manipulated variable to thereby previously suppress overshooting in the valve timing feedback control.

In step S104, when the absolute value of the difference described above is less than the predetermined value, ECU 114 determines that abnormality is absent in the rotation phase detection section.

Then ECU 114 proceeds the processing to step S105, obtains the final actual VTC angle (final ANGF value) as the actual VTC angle (ANG) detected in step S103, and performs the normal valve timing feedback control based on the aforementioned actual VTC angle:

Actual VTC angle(final ANGF value)=Actual VTC angle(ANG).

Next, when the actual VTC angle is not detected by the rotation phase detection section, ECU 114 obtains, in step S106, the final actual VTC angle as the value obtained by integrating the VTC change angle (VAR) calculated in step S102 with the actual VTC angle (ANGF) obtained in step S105, and performs the feedback control.

According to the first embodiment described above, by performing the determination through the comparison using motor rotation sensor 201 with a higher detection frequency than a detection frequency of the rotation phase detection section having a longer detection cycle, it is possible to quickly detect abnormality in the rotation phase detection section.

Moreover, after shifting to the fail-safe control of continuously performing the normal VTC driving control from a time point at which abnormality has been detected, it is possible to avoid calculation of an erroneous motor manipulated variable in the valve timing feedback control, previously suppressing the occurrence of overshooting with respect to a target. Consequently, it is possible to suppress the deterioration of the engine performance and the occurrence of secondary failure such as the stopper durability deterioration and the firm attachment to the stopper by electric VTC 113.

Figure 15:
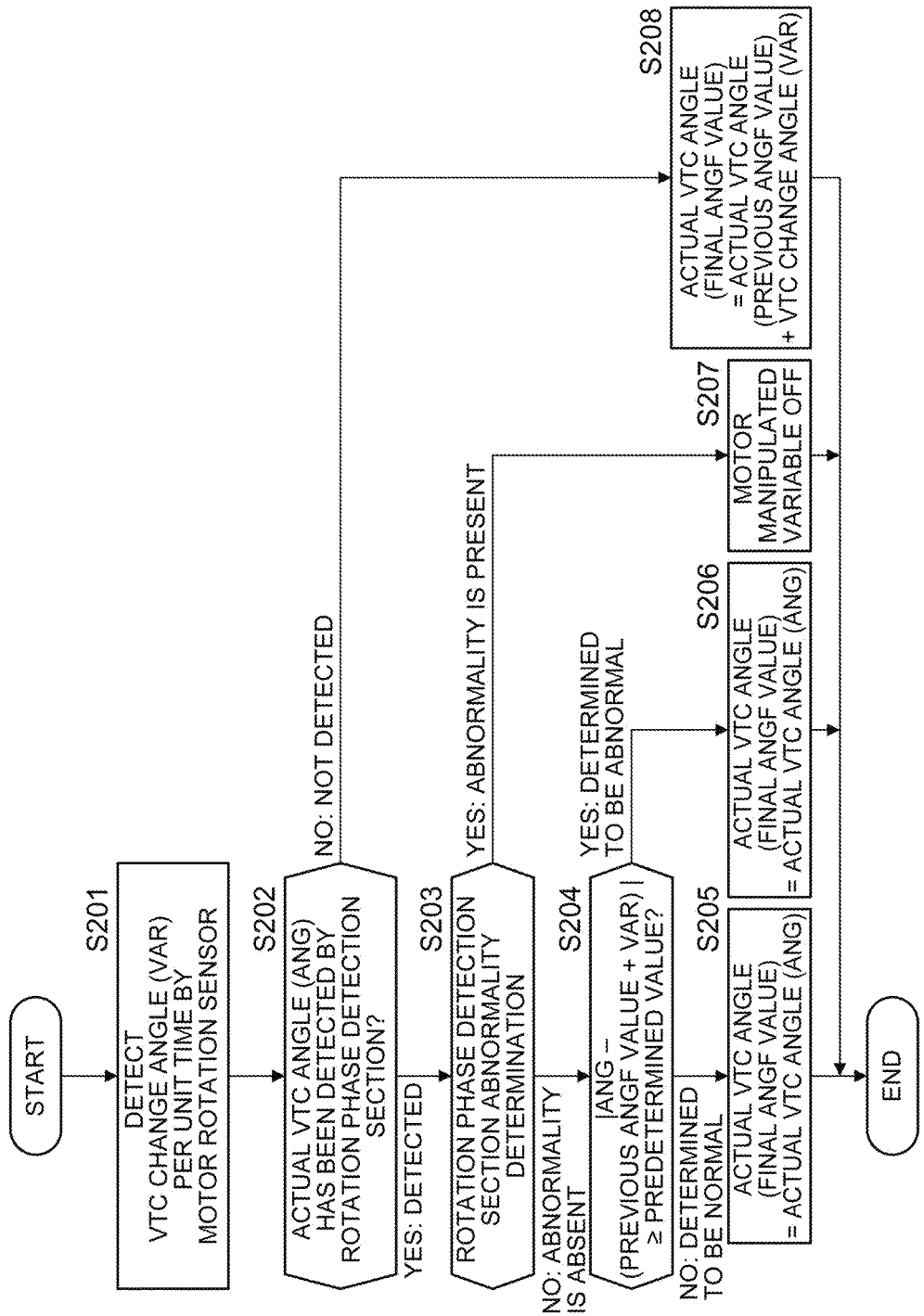
FIG. 15 is a flowchart illustrating abnormality detection processing according to the second embodiment performed when valve timing is controlled by the variable valve timing mechanism.

FIG. 15 illustrates a flow of abnormality detection processing according to a second embodiment performed when the valve timing is controlled by a variable valve timing mechanism.

In the first embodiment, the detection of abnormality in the rotation phase detection section is performed in step S104 after confirmation that motor rotation sensor 201 is normal, while presence or absence of abnormality in motor rotation sensor 201 is determined by the same method for abnormality detection after confirmation that the rotation phase detection section is normal.

Steps different from the steps of the first embodiment will be mainly described.

In the present embodiment, ECU 114 does not perform the detection of abnormality in motor rotation sensor 201 which is performed in step S101 in the first embodiment, but determines, in steps S201 and S202 as in steps S102 and S103, whether or not the actual VTC angle has been detected following the calculation of the VTC change angle. When the actual VTC angle has not been detected in step S202, ECU 114 proceeds the processing to step S208. In step S208, as is a case with the proceeding from step S103 to step S106, ECU 114 integrates the VTC change angle with the previously obtained actual VTC angle (previous ANGF value) to obtain a final actual VTC angle (final ANGF value), and continues the VTC driving control.

Next, in step S203, ECU 114 performs the aforementioned conventional detection of abnormality in a rotation phase detection section, that is, determines whether or not a sequence of the cylinder determination based on the cam signal PHASE provided from cam sensor 133 is correct.

Upon determination in step S203 that abnormality is present in the rotation phase detection section, ECU 114 proceeds the processing to step S207, and performs the fail-safe control of turning off the output of the motor manipulated variable to stop the VTC driving control.

Consequently, it is possible to suppress the VTC driving based on the erroneous motor manipulated variable.

Upon determination in step S203 that abnormality is absent, ECU 114 proceeds the processing to step S204, and performs the same abnormality detection as the abnormality detection performed in step S104 of the first embodiment.

In the present embodiment, since it is determined in step S203 that abnormality is absent in the rotation phase detection section, when the absolute value of the difference is equal to or greater than the predetermined value in step S204, ECU 114 determines that abnormality is present in motor rotation sensor 201 and proceeds the processing to step S206. In step S206, ECU 114 obtains the final actual VTC angle (final ANGF value) as the actual VTC angle (ANG) calculated in step S202.

Specifically, in a case where abnormality has occurred in motor rotation sensor 201, the VTC driving control is continued only based on the actual VTC angle detected by the rotation angle detection section.

On the other hand, upon determination in step S204 that abnormality is absent in motor rotation sensor 201, ECU 114 proceeds the processing to step S205, and provides the actual VTC angle detected in step S203 as the final actual VTC angle, as in step S105.

The second embodiment described above differs from the first embodiment in that after confirmation that the rotation phase detection section is normal, presence or absence of abnormality in motor rotation sensor 201 is determined based on whether or not the absolute value (|ANG−(previous ANGF value+VAR)|) of the difference based on the actual VTC angle and the VTC change angle is equal to or greater than the predetermined value, that is, the abnormality detection.

Figure 16:
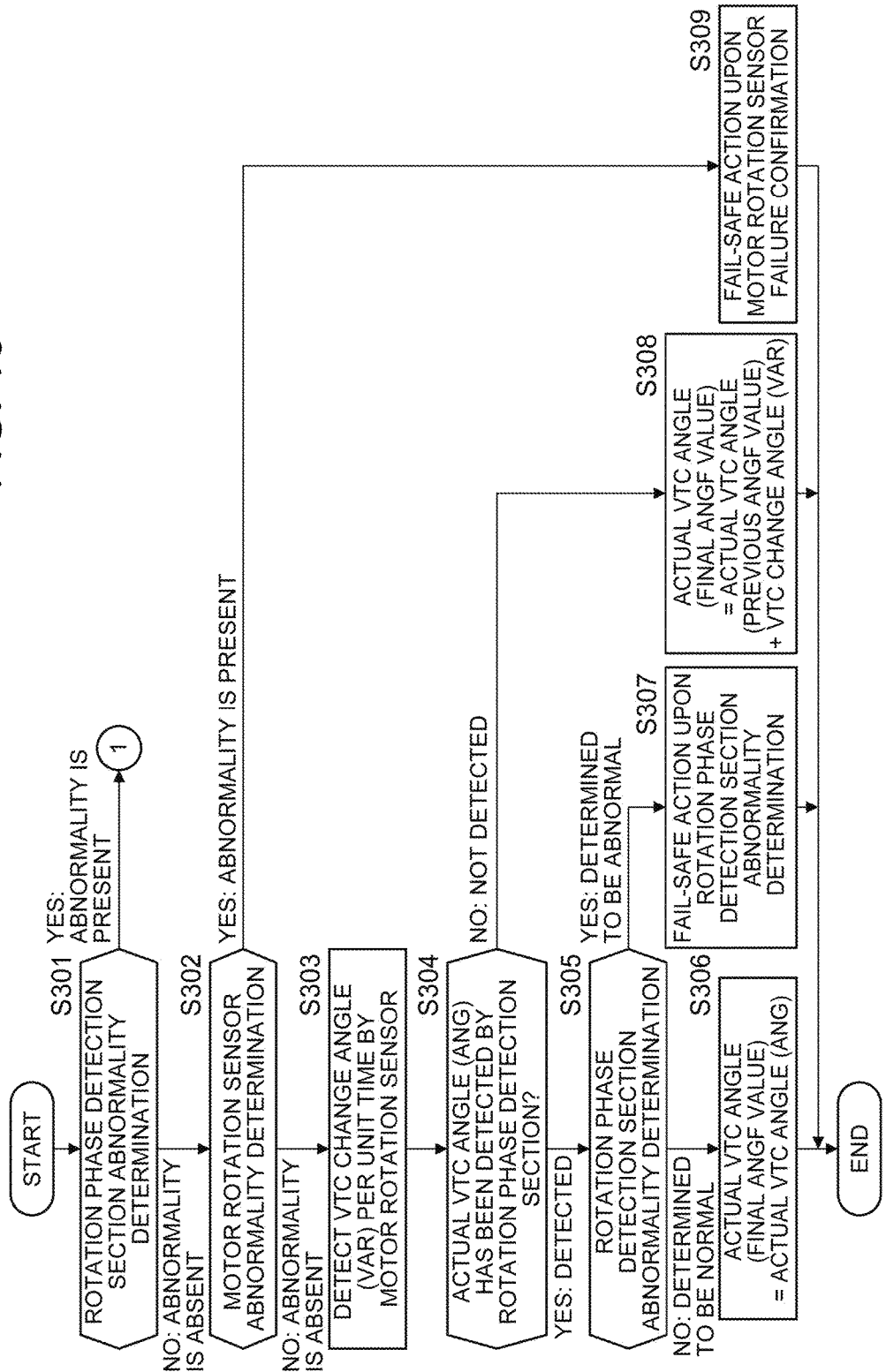
FIG. 16 is part of a flowchart illustrating abnormality detection processing according to the third embodiment performed when valve timing is controlled by the variable valve timing mechanism.
Figure 17:
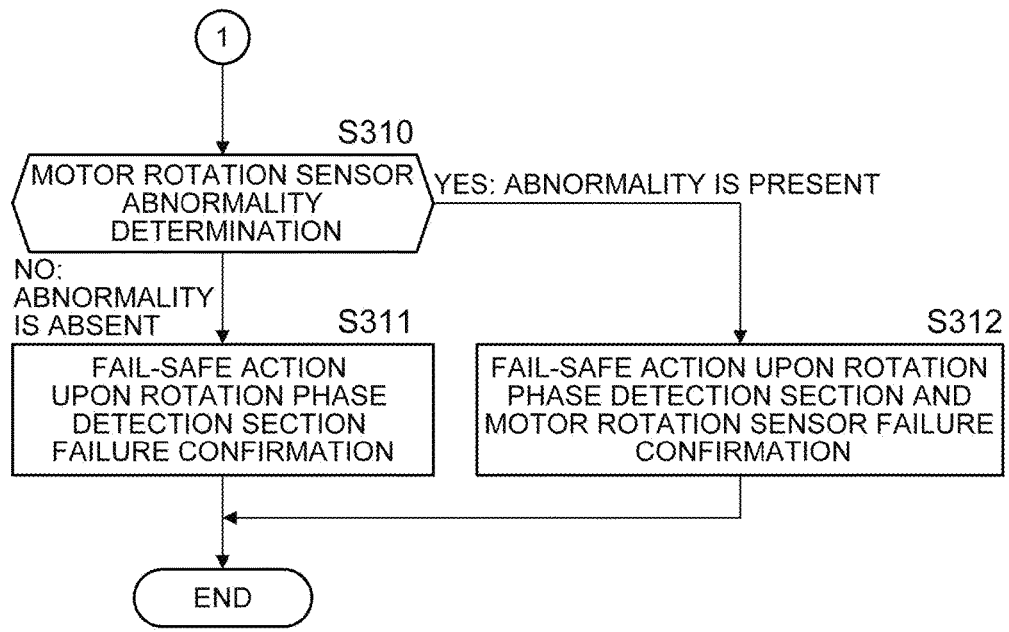
FIG. 17 is part of the flowchart.

FIGS. 16 and 17 illustrate flows of abnormality detection processing according to the third embodiment performed when the valve timing is controlled by a variable valve timing mechanism.

In the third embodiment, while considering a case where abnormality has occurred in both the rotation phase detection section and motor rotation sensor 201, that is, dual failure, detection of abnormality in a rotation phase detection section is performed, but abnormality detection and fail-safe control other than the abnormality detection and the various types of fail-safe control performed in the first and second embodiments are also carried out.

In step S301, as in step S203 in the second embodiment, ECU 114 performs detection of abnormality in a rotation phase detection section through the conventional cylinder determination sequence monitoring. Upon determination in step S301 that abnormality is present, ECU 114 proceeds the processing to step S310 illustrated in FIG. 17, and performs the detection of abnormality in motor rotation sensor 201, as in step S101 of FIG. 13.

Upon determination in step S310 that abnormality is absent in motor rotation sensor 201, ECU 114 proceeds the processing to step S311, and performs the fail-safe control which is to be performed upon confirmation of failure in the rotation phase detection section.

The fail-safe controls which are to be performed upon confirmation of failure in the rotation phase detection section include, in addition to integrating the VTC change angle (VAR) calculated in step S102 with the previously obtained actual VTC angle (previous ANGF value) to continue the VTC driving control as in step S106 in the first embodiment, for example, limiting the output of the motor manipulated variable (duty). Consequently, it is possible to suppress any influence of the fail-safe control on the engine performance as little as possible.

Moreover, by turning off the output of the motor manipulated variable or outputting a fixing manipulated variable for fixing electric VTC 113 at a fail-safe position (stopper position), it is also possible to suppress the stopper durability deterioration and the firm attachment caused by the erroneous motor manipulated variable.

On the other hand, when abnormality is present in motor rotation sensor 201 in step S310, that is, when abnormality has occurred in both the rotation phase detection section and motor rotation sensor 201, ECU 114 performs the fail-safe control which is to be performed upon confirmation of dual failure.

In the present case, by outputting the fixing manipulated variable for fixing electric VTC 113 at the stopper position or by turning off the output of the motor manipulated variable, it is possible to suppress the stopper durability deterioration and the firm attachment caused by the erroneous motor manipulated variable.

Returning to FIG. 16, upon determination in step S301 that abnormality is absent in the rotation phase detection section, ECU 114 proceeds the processing to step S302, and performs the detection of abnormality in motor rotation sensor 201 as in step S101 in the first embodiment. When abnormality is present in step S302, ECU 114 proceeds the processing to step S309, and performs the fail-safe control performed upon the confirmation of failure in the motor rotation sensor.

Here, as the aforementioned fail-safe control which is to be performed upon confirmation of failure in the motor rotation sensor, not only by turning off the output of the motor manipulated variable as in step S107 in the first embodiment, but also by limiting the output of the motor manipulated variable, it is possible to suppress the influence of the fail-safe control on the engine performance as little as possible.

Moreover, by outputting the fixing manipulated variable for fixing electric VTC 113 at the stopper position, it is also possible to suppress the stopper durability deterioration and the firm attachment caused by the erroneous motor manipulated variable.

Moreover, since it is determined in step S301 that abnormality is absent in the rotation phase detection section, the VTC driving control may be continued only with the actual VTC angle detected by the rotation phase detection section. At this point, the detection cycle of the final actual VTC angle varies, and thus it is possible to switch a control gain used for driving of electric VTC 113 to stabilize the driving control of electric VTC 113, thereby suppressing the influence of the fail-safe control on the engine performance as little as possible.

Moreover, although it is determined in step S301 that abnormality is absent in the rotation phase detection section, noise may be detected in a signal outputted by the rotation phase detection section.

In the present case, a risk of engine performance deterioration and the firm attachment to the stopper are high during extremely low engine rotation, and thus ECU 114 turns off the output of the motor manipulated variable.

On the other hand, even when single abnormality has occurred due to, for example, the noise in the rotation phase detection section, a time period during which the driving is continued based on the erroneous motor manipulated variable is short, and thus, for example, at an engine rotation speed which has not so high risks of the engine performance deterioration and the firm attachment to the stopper, that is, for example, during high rotation, it is possible to continue the driving control of electric VTC 113 only with the actual VTC angle detected by the rotation phase detection section.

Consequently, it is possible to suppress the influence of the fail-safe control on the engine performance as little as possible.

Upon determination in step S302 that abnormality is absent in motor rotation sensor 201, ECU 114 proceeds the processing to step S303.

In steps S303 and S304, as in steps S102 and S103 in the first embodiment, ECU 114 calculates the VTC change angle (step S303), and determines whether or not the actual VTC angle has been detected (step S304).

When the actual VTC angle has not been detected in step S304, ECU 114 proceeds the processing to step S308, and, as in step S106 in the first embodiment, obtains a final actual VTC angle based on the previously obtained actual VTC angle (previous ANGF value) and the VTC change angle (VAR), and performs the normal valve timing feedback control based on the aforementioned actual VTC angle.

When the actual VTC angle has been detected in step S304, ECU 114 proceeds the processing to step S305, and performs the detection of abnormality in a rotation phase detection section.

In the abnormality detection, as described above, the presence or absence of abnormality in the rotation phase detection section may be determined through determination whether or not the absolute value of the difference between the actual VTC angle (ANG) detected in step S304 and the value obtained by integrating the VTC change angle (VAR) calculated in step S303 with the previously obtained actual VTC angle (previous ANGF value) is equal to or greater than the predetermined value, but a different method for abnormality detection will be described in the third embodiment.

Note that, in the third embodiment, the detection of abnormality in a rotation phase detection section is performed by each of methods for abnormality detection to be described later on, which may be applied to the detection of abnormality in motor rotation sensor 201 performed in step S204 of the second embodiment.

Figure 18:
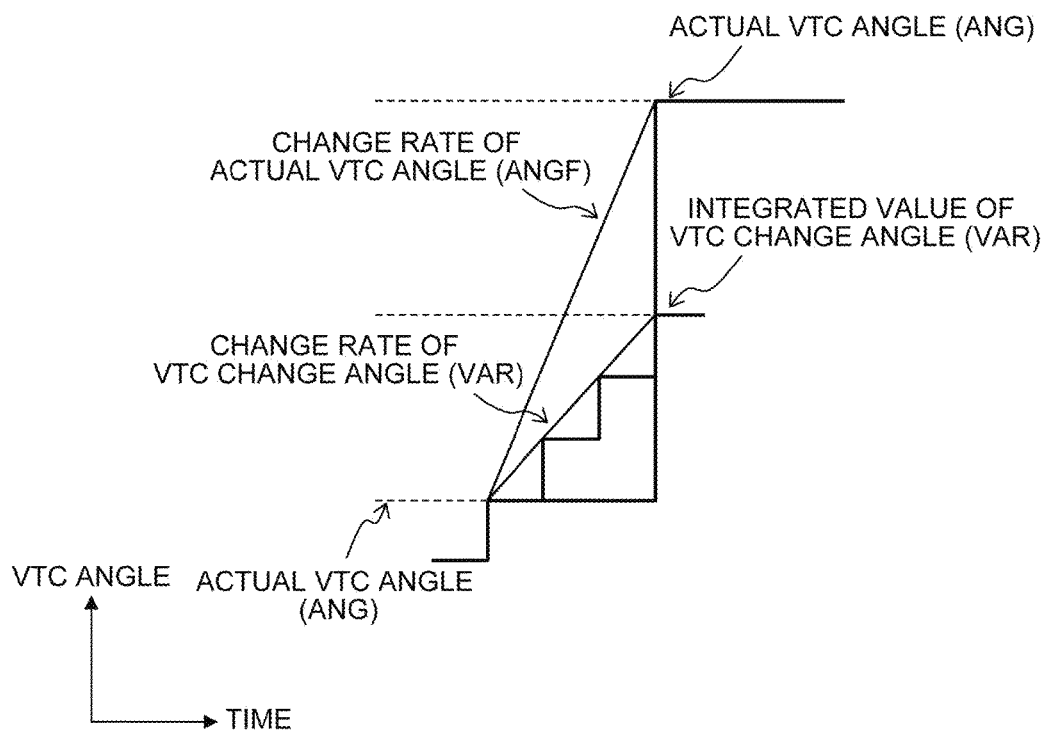
FIG. 18 is a time chart illustrating changes in the various state quantities used when the valve timing is controlled.

For example, as illustrated in FIG. 18, the presence or absence of abnormality may be determined based on whether or not an absolute value of a difference between a change rate (inclination) between the previously detected actual VTC angle and the currently detected actual VTC angle and a change rate (inclination) of the actual VTC angle calculated based on an integrated value of the VTC change angles detected a plurality of times from a time point at which the actual VTC angle was detected last time to a time point at which the actual VTC angle is currently detected is equal to or greater than a predetermined value (threshold value for abnormality judgment). Specifically, ECU 114 determines whether or not an absolute value of a difference between the change rate of the actual VTC angle (rotation phase) detected at predetermined cycles by the rotation phase detection section and a change rate of a rotation phase calculated based on an integrated value of the VTC change angles (relative change angle) detected at predetermined cycles described above by motor rotation sensor 201 is equal to or greater than the predetermined value.

Figure 19:
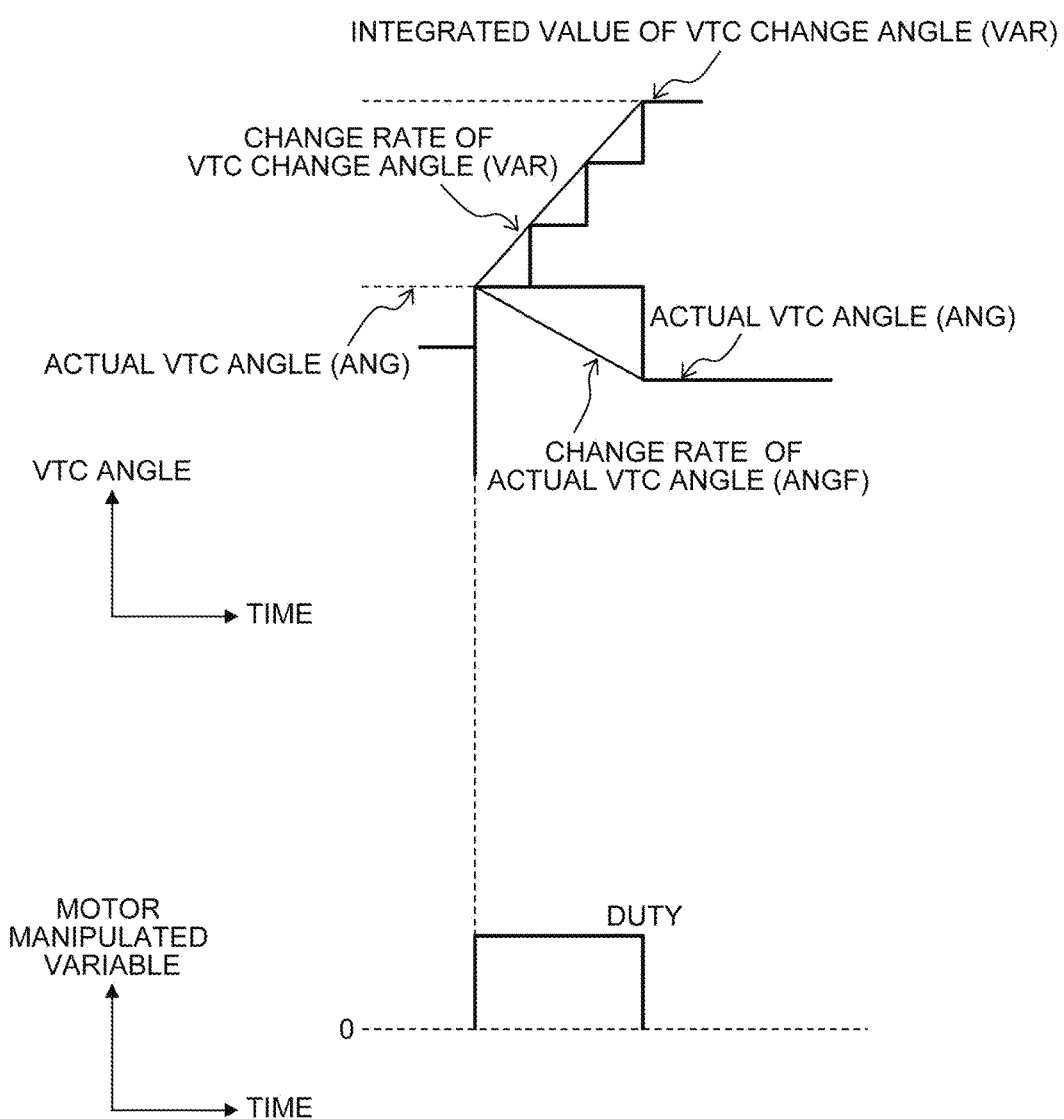
FIG. 19 is a time chart illustrating changes in the various state quantities used when the valve timing is controlled.

Moreover, for example, as illustrated in FIG. 19, it is assumed that the motor manipulated variable (duty) is outputted in a direction in which the actual VTC angle increases, and until detection of the current actual VTC angle, motor rotation sensor 201 is normal and the VTC change angle increases.

At this point, as a result of abnormality occurring in the rotation phase detection section, such an actual VTC angle that decreases may erroneously be detected currently.

Therefore, the presence or absence of abnormality may be determined based on whether or not there is a difference between an application direction of the motor manipulated variable (duty) calculated based on the VTC change angle detected by motor rotation sensor 201, that is, a relative rotation direction of intake camshaft 134 with respect to crankshaft 120 according to the manipulated variable and a relative rotation direction of intake camshaft 134 derived from the current actual VTC angle (rotation phase) detected by the rotation phase detection section.

In the present case, it is possible to determine that abnormality is present in motor rotation sensor 201, when there is disagreement between the relative rotation direction of intake camshaft 134 according to the manipulated variable and the relative rotation direction of intake camshaft 134 derived from the integrated value of the VTC change angles (relative change angles) detected in the predetermined cycle by motor rotation sensor 201.

Figure 20:
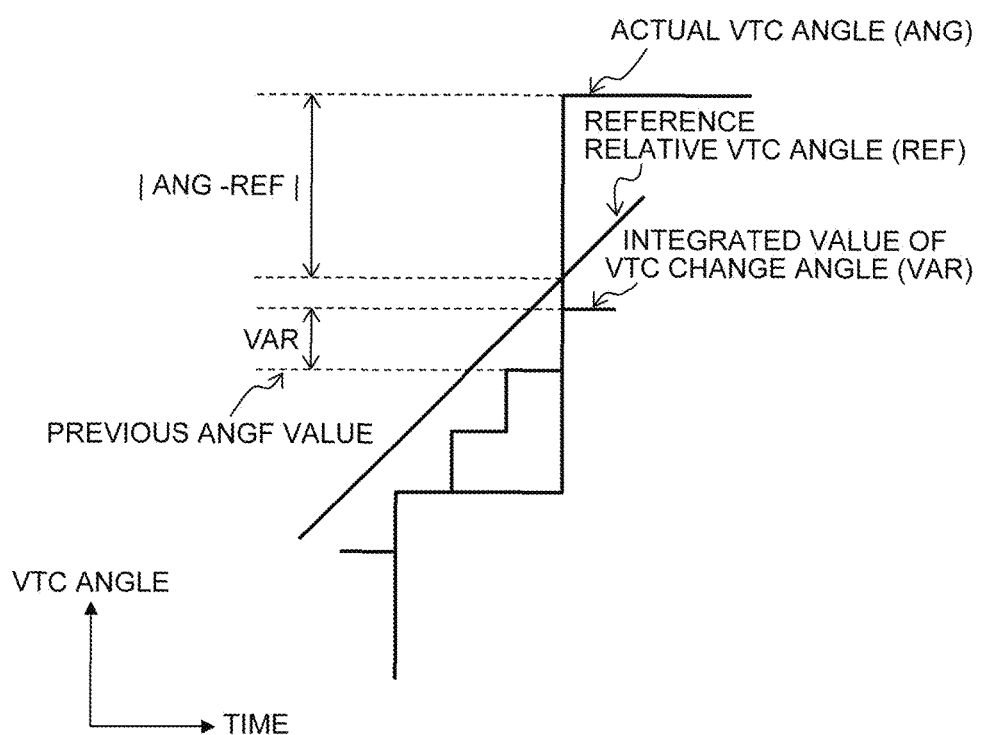
FIG. 20 is a time chart illustrating changes in the various state quantities used when the valve timing is controlled.

Moreover, for example, in a case where a reference model (an internal model for actuator driving control) calculation section, which calculates a reference relative VTC angle which changes following a change in the target VTC angle, is provided, as illustrated in FIG. 20, the presence or absence of abnormality may be determined based on whether or not an absolute value of a difference between a reference relative VTC angle (REF) (a change amount thereof in the predetermined cycle) calculated by the aforementioned calculation section and the currently detected actual VTC angle (ANG) (a change amount of rotation phase) is equal to or greater than a predetermined value (a threshold value for abnormality determination).

In the present case, it is also possible to determine that abnormality is present in motor rotation sensor 201, when an absolute value of a difference between the reference relative VTC angle (REF) and an actual VTC angle (rotation phase) calculated based on an integrated value of the VTC change angles detected in the predetermined cycle by motor rotation sensor 201 is equal to or greater than a predetermined value.

Then, upon determination in step S305 through any of the aforementioned methods that abnormality is absent in the rotation phase detection section, ECU 114 proceeds the processing to step S306. In step S306, ECU 114 obtains the final actual VTC angle (final ANGF value) as the actual VTC angle (ANG) detected in step S304, and performs the normal valve timing feedback control based on the aforementioned actual VTC angle. On the other hand, when the actual VTC angle has not been detected by the rotation phase detection section in step S304, ECU 114, in step S308, obtains the final actual VTC angle as the value obtained by integrating the VTC change angle (VAR) calculated in step S303 with the actual VTC angle (ANGF) obtained in step S306, and performs the feedback control.

On the other hand, upon determination in step S305 that abnormality is present in the rotation phase detection section, ECU 114 proceeds the processing to step S307, and performs the fail-safe control which is to be performed upon abnormality occurrence in the rotation phase detection section.

Permitted fail-safe controls as the fail-safe control performed in step S307 include: for example, continuing the normal VTC driving control in a manner such that the final actual VTC angle is provided as the value obtained by integrating the VTC change angle (VAR) with the previously obtained actual VTC angle (previous ANGF value), as in the processing from step S104 to step S106 in the first embodiment; and limiting or turning off the output of the motor manipulated variable and outputting the fixing manipulated variable, as in the aforementioned confirmation of failure in the motor rotation sensor.

Moreover, the fail-safe control performed upon the determination of abnormality in the rotation phase detection section may be switched stepwise, for example, according to an increase in the number of times of abnormality determination performed in step S305, in a manner such as: continuing the VTC driving control (final ANGF value=previous ANGF value+VAR), limiting the output of the motor manipulated variable, outputting the fixing manipulated variable, and turning off the output of the motor manipulated variable.

Moreover, the fail-safe control may be switched stepwise according to an increase in an abnormality determination level (for example, a size of the absolute value of the difference) in step S305 in a manner such as: continuing the VTC driving control (small absolute value of the difference), limiting the output of the motor manipulated variable (middle absolute value of the difference), and outputting the fixing manipulated variable or turning off the output of the motor manipulated variable (large absolute value of the difference).

Specifically, it is possible to suppress the influence on the engine performance by switching the fail-safe control stepwise according to the number of times or degree of abnormality determination in step S305.

In the third embodiment described above, the detection of abnormality in the rotation phase detection section is performed while considering the dual failure with which abnormality occurs in both the rotation phase detection section and the motor rotation sensor, and the abnormality detection and the various fail-safe controls other than the abnormality detection and the various fail-safe controls which are performed in the first and second embodiments have been described.

In any of the embodiments, it is possible to determine, based on the rotation phase detection section and the motor rotation sensor with a higher detection frequency than a detection frequency of the rotation phase detection section, presence or absence of abnormality in the both to thereby quickly detect the abnormality. When abnormality is detected, shifting to the fail-safe control occurs to avoid calculation of the erroneous motor manipulated variable, making it possible to previously suppress overshooting with respect to a target due to the erroneous motor manipulated variable.

Consequently, it is possible to suppress the deterioration of the engine performance and the secondary failure such as the stopper durability deterioration and the firm attachment to the stopper as a result of the strong abutting of the valve timing mechanism, during extremely low engine rotation.

Moreover, in the embodiment described above, the abnormality detection is performed during extremely low engine rotation such as during starting and during stopping process. However, the cycle of detection performed by the rotation phase detection section is short during a high level of engine rotation equal to or greater than a predetermined level and a possibility of an increase in the aforementioned difference is not so high, and thus the abnormality detection according to each embodiment is not required to be performed. Consequently, it is possible to achieve a reduction in loads of calculation involved in the abnormality detection during high engine rotation.

Moreover, in each of the embodiments, even in an event of shifting to the various fail-safe controls as a result of determination that abnormality is present in the rotation phase detection section or the motor rotation sensor, the fail-safe control may be released if normal determination is continued through subsequent abnormality detection.

Moreover, the above embodiment indicates what is applied to the control of switching between the valve timing for the mirror cycle operation of the intake valve and the valve timing for starting, but it is possible to set optimum valve timing for starting even for any engine which does not perform the mirror cycle operation.

It is also applicable to, for example, control of the exhaust valve at valve timing suitable for starting, for example, during starting or stopping process in the electric VTC which changes the valve timing of the exhaust valve with the electric motor.

Moreover, the device for detecting abnormality in a rotation phase detection device according to each embodiment has been applied to the control device for the variable valve timing mechanism above, but application of such a device for detecting abnormality is not limited to the aforementioned control device. The aforementioned device for detecting abnormality is also applicable to any configuration which includes: a first rotation detection section which detects a rotation phase of a second rotating body with respect to a first rotating body based on a rotation angular position of the first rotating body and a rotation angular position of the second rotating body which is caused to make relative rotation with respect to the first rotating body by an actuator; and a second rotation detection section which detects a relative change angle of the second rotation body with respect to the first rotation body with a higher detection frequency than a frequency of detection performed by the first detection section.

REFERENCE SYMBOL LIST

12 Electric motor
13 Motor shaft
101 Internal combustion engine
105 Intake valve
113 Electric VTC
114 ECU
117 Crank angle sensor
133 Cam sensor
134 Intake camshaft
201 Motor rotation sensor

The invention claimed is:

1. A device for detecting abnormality in a rotation phase detection device, the rotation phase detection device including a rotation phase detector which detects a rotation phase of a camshaft with respect to a crankshaft every predetermined cycle, based on a rotation angular position of the crankshaft and a rotation angular position of the camshaft rotated by an actuator with respect to the crankshaft; and a rotation sensor which detects a relative change angle of the camshaft caused by the actuator with respect to the crankshaft with a higher detection frequency than a detection frequency of the rotation phase detector, the device comprising:

an electronic control unit in communication with the rotation phase detection device, wherein the electronic control unit is configured to determine a presence or an absence of abnormality in one of the rotation phase detector or the rotation sensor, based on a change amount of the rotation phase detected by the rotation phase detector and an integrated value of the relative change angle in the predetermined cycle detected by the rotation sensor, and wherein the electronic control unit is configured to adjust a driving control of at least the camshaft in response to determining the presence or the absence of abnormality.

2. The device for detecting abnormality in a rotation phase detection device according to claim 1, wherein upon determining that one of the rotation phase detector or the rotation sensor is normal based on only one of a detection value of the rotation phase detector or a detection value of the rotation sensor, the electronic control unit is configured to compare the detection value of the rotation phase detector to the detection value of the rotation sensor to determine the presence or the absence of abnormality in the other of the rotation phase detector and the rotation sensor.

3. The device for detecting abnormality in a rotation phase detection device according to claim 1, wherein the electronic control unit is configured to determine that abnormality is present in one of the rotation phase detector or the rotation sensor, when an absolute value of a difference between a change rate of the rotation phase detected by the rotation phase detector and a change rate of a rotation phase calculated based on the integrated value of the relative change angle in the predetermined cycle detected by the rotation sensor is equal to or greater than a predetermined value.

4. The device for detecting abnormality in a rotation phase detection device according to claim 1, wherein the electronic control unit is configured to determine that abnormality is present in one of the rotation phase detector or the rotation sensor, when an absolute value of a difference between a change amount of the rotation phase detected by the rotation phase detector and a change amount of a rotation phase calculated based on the integrated value of the relative change angle in the predetermined cycle detected by the rotation sensor is equal to or greater than a predetermined value.

5. The device for detecting abnormality in a rotation phase detection device according to claim 1, wherein the electronic control unit is configured to determine that abnormality is present in one of the rotation phase detector or the rotation sensor which has a disagreement between a relative rotation direction of the camshaft with respect to the crankshaft according to a manipulated variable of the actuator and one of a relative rotation direction of the camshaft derived from the rotation phase detected by the rotation phase detector or a relative rotation direction of the camshaft derived from the integrated value of the relative change angle in the predetermined cycle detected by the rotation sensor.

6. The device for detecting abnormality in a rotation phase detection device according to claim 1, wherein the electronic control unit is configured to determine that abnormality is present in one of the rotation phase detector or the rotation sensor having an absolute value of a difference equal to or greater than a predetermined value, the difference being between a rotation phase of the camshaft calculated according to an internal model for driving control of the actuator and one of the rotation phase detected by the rotation phase detector or a rotation phase calculated based on the integrated value of the relative change angle detected by the rotation sensor in the predetermined cycle.

7. The device for detecting abnormality in a rotation phase detection device according to claim 1, wherein the electronic control unit is configured to stop determination of abnormality when the camshaft is rotating at a speed equal to or higher than a predetermined speed.

8. The device for detecting abnormality in a rotation phase detection device according to claim 1, wherein the electronic control unit is configured to control a variable valve timing mechanism of an engine, the rotation phase detector is structured to detect the rotation phase of the camshaft with respect to the crankshaft, which is driven by the engine, the rotation sensor is an actuator rotation sensor detecting, with a higher frequency than a frequency of a rotation phase detection by the rotation phase detector, an amount of rotational operation including a rotation direction of the actuator capable of changing the rotation phase by causing relative rotation of the camshaft with respect to the crankshaft, as the relative change angle of the camshaft with respect to the crankshaft, the electronic control unit is configured to perform a feedback control in a manner such as to bring the rotation phase closer to a target value, based on the rotation phase detected by the rotation phase detector and the relative change angle detected by the actuator rotation sensor, and the electronic control unit is configured to determine the presence or the absence of abnormality in one of the rotation phase detector or the actuator rotation sensor, based on a change amount of the rotation phase detected by the rotation phase detector and an integrated value of the relative change angle detected by the actuator rotation sensor in the predetermined cycle.

9. The device for detecting abnormality in a rotation phase detection device according to claim 8, wherein the electronic control unit is configured to determine that an actual rotation phase before the engine is started is brought closer to a target rotation phase set at a time of a previous feedback control performed during an engine stopping process and then, start driving control of the variable valve timing mechanism based on only the amount of rotational operation detected by the actuator rotation sensor during starting of the engine, and determine the presence or the absence of abnormality after the rotation phase is first detected by the rotation phase detector.

10. A device for controlling a rotation position of a rotating body, comprising the device according to claim 1, for detecting abnormality in a rotation phase detection device, wherein upon determining that abnormality is present in one of the rotation phase detector or the rotation sensor, the electronic control unit is configured to cause the driving control of the camshaft by the actuator to continue, or to limit or stop output of a manipulated variable for driving the actuator, according to a rotation phase of the camshaft calculated based on a detection value of the other of the rotation phase detector or the rotation sensor.

11. A method for detecting abnormality in a rotation phase detection device, the rotation phase detection device including a rotation phase detector which detects a rotation phase of a camshaft with respect to a crankshaft every predetermined cycle, based on a rotation angular position of the crankshaft and a rotation angular position of the camshaft rotated by an actuator with respect to the crankshaft; and a rotation sensor which detects a relative change angle of the camshaft caused by the actuator with respect to the crankshaft with a higher detection frequency than a detection frequency of the rotation phase detector, the method comprising:

determining, by an electronic control unit in communication with the rotation phase detection device, a presence or an absence of abnormality in one of the rotation phase detector or the rotation sensor, based on a change amount of the rotation phase detected by the rotation phase detector and an integrated value of the relative change angle in the predetermined cycle detected by the rotation sensor, and adjusting, by the electronic control unit, a driving control of at least the camshaft in response to determining the presence or the absence of abnormality.

12. The method for detecting abnormality in a rotation phase detection device according to claim 11, further comprising:

upon determining, by the electronic control unit, that one of the rotation phase detector or the rotation sensor is normal based on only one of a detection value of the rotation phase detector or a detection value of the rotation sensor, comparing, by the electronic control unit, the detection value of the rotation phase detector to the detection value of the rotation sensor to determine the presence or the absence of abnormality in the other of the rotation phase detector and the rotation sensor.

13. The method for detecting abnormality in a rotation phase detection device according to claim 11, further comprising:

determining, by the electronic control unit, that abnormality is present in one of the rotation phase detector or the rotation sensor when an absolute value of a difference between a change rate of the rotation phase detected by the rotation phase detector and a change rate of a rotation phase calculated based on the integrated value of the relative change angle in the predetermined cycle detected by the rotation sensor is equal to or greater than a predetermined value.

14. The method for detecting abnormality in a rotation phase detection device according to claim 11, further comprising:

determining, by the electronic control unit, that abnormality is present in one of the rotation phase detector or the rotation sensor when an absolute value of a difference between a change amount of the rotation phase detected by the rotation phase detector and a change amount of a rotation phase calculated based on the integrated value of the relative change angle in the predetermined cycle detected by the rotation sensor is equal to or greater than a predetermined value.

15. The method for detecting abnormality in a rotation phase detection device according to claim 11, further comprising:

determining, by the electronic control unit, that abnormality is present in one of the rotation phase detector or the rotation sensor which has a disagreement between a relative rotation direction of the camshaft with respect to the crankshaft according to a manipulated variable of the actuator and one of a relative rotation direction of the camshaft derived from the rotation phase detected by the rotation phase detector or a relative rotation direction of the camshaft derived from the integrated value of the relative change angle in the predetermined cycle detected by the rotation sensor.

* * * * *